United States Patent
Sunkavalli et al.

(10) Patent No.: US 11,551,388 B2
(45) Date of Patent: Jan. 10, 2023

(54) IMAGE MODIFICATION USING DETECTED SYMMETRY

(71) Applicant: Adobe Inc., San Jose, CA (US)

(72) Inventors: Kalyan Krishna Sunkavalli, San Jose, CA (US); Nathan Aaron Carr, San Jose, CA (US); Michal Lukác, San Jose, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 32 days.

(21) Appl. No.: 16/794,908

(22) Filed: Feb. 19, 2020

(65) Prior Publication Data

US 2020/0184697 A1 Jun. 11, 2020

Related U.S. Application Data

(62) Division of application No. 15/346,638, filed on Nov. 8, 2016, now Pat. No. 10,573,040.

(51) Int. Cl.
*G06T 7/68* (2017.01)
*G06T 11/60* (2006.01)
(Continued)

(52) U.S. Cl.
CPC ............ *G06T 11/60* (2013.01); *G06K 9/6215* (2013.01); *G06K 9/6276* (2013.01); *G06T 5/005* (2013.01);
(Continued)

(58) Field of Classification Search
CPC ......... G06T 11/60; G06T 3/20; G06T 7/0002; G06T 7/608; G06T 7/68; G06T 7/49;
(Continued)

(56) References Cited

U.S. PATENT DOCUMENTS 6,128,578 A * 10/2000 Sakaino ................. G06T 7/246
702/3
8,229,247 B1 * 7/2012 Huang ................. G06T 3/0093
348/580
(Continued)

FOREIGN PATENT DOCUMENTS

WO WO-2016066038 A1 * 5/2016 ........... G06K 9/0063

OTHER PUBLICATIONS

Seungkyu Lee, Yanxi Liu,; "Skewed Rotation Symmetry Group Detection", IEEE, Sep. 2010.*
(Continued)

*Primary Examiner* — Shaghayegh Azima
(74) *Attorney, Agent, or Firm* — FIG. 1 Patents

(57) ABSTRACT

Image modification using detected symmetry is described. In example implementations, an image modification module detects multiple local symmetries in an original image by discovering repeated correspondences that are each related by a transformation. The transformation can include a translation, a rotation, a reflection, a scaling, or a combination thereof. Each repeated correspondence includes three patches that are similar to one another and are respectively defined by three pixels of the original image. The image modification module generates a global symmetry of the original image by analyzing an applicability to the multiple local symmetries of multiple candidate homographies contributed by the multiple local symmetries. The image modification module associates individual pixels of the original image with a global symmetry indicator to produce a global symmetry association map. The image modification module produces a manipulated image by manipulating the original image under global symmetry constraints imposed by the global symmetry association map.

20 Claims, 17 Drawing Sheets

(51) Int. Cl.
G06K 9/62 (2022.01)
G06T 5/00 (2006.01)
G06T 7/49 (2017.01)
G06V 10/42 (2022.01)
G06V 10/75 (2022.01)

(52) U.S. Cl.
CPC .............. *G06T 7/49* (2017.01); *G06T 7/68* (2017.01); *G06V 10/42* (2022.01); *G06V 10/757* (2022.01)

(58) Field of Classification Search
CPC .... G06T 5/005; G06K 9/6276; G06K 9/6215; G06K 9/52; G06K 9/6211; G06V 10/42; G06V 10/757
See application file for complete search history.

(56) References Cited

U.S. PATENT DOCUMENTS

| | | | | |
|---|---|---|---|---|
| 8,300,951 | B1* | 10/2012 | Mech | G06V 10/46 382/203 |
| 9,240,055 | B1* | 1/2016 | Liu | G06T 11/60 |
| 9,317,773 | B2* | 4/2016 | Shechtman | G06V 10/751 |
| 10,262,229 | B1* | 4/2019 | Rao | G06V 10/431 |
| 10,573,040 | B2 | 2/2020 | Sunkavalli et al. | |
| 2005/0128197 | A1* | 6/2005 | Thrun | G06T 7/55 345/421 |
| 2010/0194860 | A1* | 8/2010 | Mentz | H04N 5/2252 348/47 |
| 2011/0123120 | A1* | 5/2011 | Quack | G06F 16/5838 382/197 |
| 2011/0181589 | A1* | 7/2011 | Quan | G06T 17/05 345/420 |
| 2013/0011069 | A1* | 1/2013 | Quan | G06F 16/583 382/190 |
| 2014/0193047 | A1* | 7/2014 | Grosz | G06Q 10/10 382/118 |
| 2015/0145862 | A1* | 5/2015 | Liu | G06V 10/42 345/419 |
| 2015/0278642 | A1* | 10/2015 | Chertok | G06V 10/426 382/156 |
| 2016/0086052 | A1* | 3/2016 | Piekniewski | G06V 10/462 382/103 |
| 2016/0321787 | A1* | 11/2016 | Zhao | G06T 5/006 |
| 2017/0228872 | A1* | 8/2017 | An | G06T 7/12 |
| 2017/0345130 | A1* | 11/2017 | Wang | H04N 19/172 |
| 2018/0005071 | A1* | 1/2018 | Idrees | G06V 10/435 |
| 2018/0130241 | A1* | 5/2018 | Sunkavalli | G06K 9/6215 |

OTHER PUBLICATIONS

Nahum Kiryati, Yossi Gofman; "Detecting Symmetry in Grey Level Images: The Global Optimization Approach"; International Journal of Computer Vision, 1998.*
Seungkyu Lee, and Yanxi Liu; "Skewed Rotation Symmetry Group Detection", IEEE, Nov. 2010.*
"Corrected Notice of Allowability", U.S. Appl. No. 15/346,638, dated Nov. 13, 2019, 2 pages.
"Final Office Action", U.S. Appl. No. 15/346,638, dated Jun. 19, 2019, 23 pages.
"First Action Interview Office Action", U.S. Appl. No. 15/346,638, dated Apr. 8, 2019, 4 pages.
"Non-Final Office Action", U.S. Appl. No. 15/346,638, dated Dec. 31, 2018, 23 pages.
"Notice of Allowance", U.S. Appl. No. 15/346,638, dated Oct. 16, 2019, 20 pages.
"Pre-Interview First Office Action", U.S. Appl. No. 15/346,638, dated Jan. 22, 2019, 4 pages.
"Restriction Requirement", U.S. Appl. No. 15/346,638, dated Aug. 30, 2018, 8 pages.

Agarwala,"Interactive digital photomontage", ACM Transactions on Graphics (Proc. SIGGRAPH), 23(3), 294-302, 2004, 2004, 9 pages.
Aiger,"Repetition Maximization based Texture Rectification", EUROGRAPHICS 2012 vol. 31 (2012), No. 2, May 2012, 10 pages.
Baker,"Lucas-Kanade 20 Years On: A Unifying Framework", International Journal of Computer Vision. 56(3), pp. 221-255, 2004., 2004, 35 pages.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
Barnes,"The Generalized PatchMatch Correspondence Algorithm", European Conference on Computer Vision—Retrieved from <http://gfx.cs.princeton.edu/pubs/Barnes_2010_TGP/generalized_pm.pdf> on Sep. 9, 2010, Sep. 2010, 14 pages.
Boykov,"Graph Cuts and Efficient N-D Image Segmentation", International Journal of Computer Vision 70(2), 109-131, 2006, Apr. 2004, pp. 109-131.
Cornelius,"Efficient Symmetry Detection Using Local Affine Frames", In Proceedings of Scandinavian Conference on Image Analysis, Jun. 2007, 10 pages.
Darabi,"Image Melding: Combining inconsistent images using patch-based synthesis", ACM Transactions on Graphics (TOG) (Proceedings of SIGGRAPH 2012), 31(4):82:1-82:10, 2012., Jul. 2012, 10 pages.
Forsyth,"Shape from texture without boundaries", International Journal of Computer Vision, Aug. 2005, 15 pages.
Grady,"Random Walks for Image Segmentation", IEEE Transactions on Pattern Analysis and Machine Intelligence, vol. 28, No. 11, Nov. 2006, 17 pages.
Hays,"Discovering Texture Regularity as a Higher-Order Correspondence Problem", In Proceedings of European Conference on Computer Vision, May 2006, 14 pages.
He,"Statistics of Patch Offsets for Image Completion", ECCV 2012, Oct. 7, 2012, 14 pages.
Huang,"Image Completion using Planar Structure Guidance", Proceedings of ACM SIGGRAPH 2014, Jul. 2014, 10 pages.
Huang,"Transformation Guided Image Completion", IEEE International Conference on Computational Photography (ICCP), Apr. 2013, 9 pages.
Kim,"Symmetry-Guided Texture Synthesis and Manipulation", ACM Trans. Graph. 31, 3, Article 22, May 2012, 14 pages.
Kiryati,"Detecting Symmetry in Grey Level Images: The Global Optimization Approach", International Journal of Computer Vision, Aug. 1998, 30 pages.
Lee,"Curved Glide-Reflection Symmetry Detection", IEEE Transactions on Pattern Analysis and Machine Intelligence 34, 2,, Jun. 2011, 8 pages.
Lee,"Skewed rotation symmetry group detection", IEEE Transactions on Pattern Analysis and Machine Intelligence, Aug. 2009, 14 pages.
Liebowitz,"Metric rectification for perspective images of planes", In Proceedings CVPR, 1998, 1998, 7 pages.
Liu,"A Computational Model for Periodic Pattern Perception Based on Frieze and Wallpaper Groups", IEEE Transactions on Pattern Analysis and Machine Intelligence 26, 3, Mar. 2004, 36 pages.
Liu,"Computational symmetry in computer vision and computer graphics", Foundations and Trends in Computer Graphics and Vision 5, 1-2, Aug. 2010, 197 pages.
Liu,"Image De-fencing", In Proceedings of IEEE Conference on Computer Vision and Pattern Recognition, Jun. 2008, 8 pages.
Liu,"Near-Regular Texture Analysis and Manipulation", ACM Transactions on Graphics (TOG)—Proceedings of ACM SIGGRAPH 2004 ., 2004, 9 pages.
Liu,"On the Limited Memory BFGS Method for Large Optimization", Aug. 1989, 27 pages.
Liu,"PatchMatch-based Automatic Lattice Detection for Near-Regular Textures", In Proceedings of IEEE International Conference on Computer Vision, Dec. 2015, 9 pages.
Loy,"Detecting Symmetry and Symmetric Constellations of Features", Proceedings of ECCV, Part II, Lncs 3952, 2006, pp. 508-521.
Metropolis,"Equation of State Calculations by Fast Computing Machines", Jun. 1953, 7 pages.

(56) References Cited

OTHER PUBLICATIONS

Mitra, "Partial and Approximate Symmetry Detection for 3D Geometry", ACM Transactions on Graphics 25, 3, Jul. 2006, 9 pages.
Mitra, "Symmetry in 3D Geometry: Extraction and Applications", In Eurographics 2012—State of the Art Reports, Feb. 2013, 23 pages.
Nocedal, "Updating Quasi-Newton Matrices with Limited Storage", Mathematics of Computation, vol. 35, No. 151, Jul. 1980, 11 pages.
Park, "Deformed Lattice Detection in Real-World Images Using Mean-Shift Belief Propagation", IEEE Transactions on Pattern Analysis and Machine Intelligence 31, 10, Oct. 2009, pp. 1804-1816.
Pauly, "Discovering Structural Regularity in 3D Geometry", ACN Trans. Graph. 27, 3, Aug. 2008, 11 pages.
Piponi, "Automatic Differentiation, C++ Templates and Photogrammetry", Journal of graphics, GPU, Sep. 13, 2004, 14 pages.
Pritts, "Detection, Rectification and Segmentation of Coplanar Repeated Patterns", In Proceedings of IEEE Conference on Computer Vision and Pattern Recognition, Jun. 2014, 8 pages.
Rother, ""GrabCut"— Interactive Foreground Extraction using Iterated Graph Cuts", ACM SIGGRAPH 2004, Aug. 2004, 6 pages.
Teo, "Detection and Segmentation of 2D Curved Reflection Symmetric Structures", In Proceedings of IEEE International Conference on Computer Vision, Dec. 2015, 9 pages.
Wu, "Resizing by Symmetry-Summarization", ACM Transactions on Graphics 29, 6, Dec. 2010, 10 pages.
Zhang, "TILT: Transform Invariant Low-rank Textures", ACCV, 2011, 2011, 24 pages.

\* cited by examiner

IMAGE MODIFICATION USING DETECTED SYMMETRY

RELATED APPLICATIONS

This Application claims priority as a divisional to U.S. patent application Ser. No. 15/346,638, filed Nov. 8, 2016, and titled Image Modification Using Detected Symmetry, the entire disclosure of which is hereby incorporated by reference.

BACKGROUND

Smart phones are ubiquitous today, and every modern smart phone includes a camera feature. Most people therefore usually have a camera within arm's reach to quickly and easily take a photograph, which is referred to herein as a digital image. At the same time, people are motivated to obtain more digital images because opportunities to share them have increased, such as through sending texts and making social media posts. Consequently, more digital images are produced than ever before.

As smart phones have evolved in recent years, the camera features have provided digital images with an increasingly higher quality appearance. Nevertheless, some digital images still present an unsatisfactory appearance. For example, a portion of a desired subject of a digital image may be blurry or obscured by a foreground object. Fortunately, digital images can be modified to ameliorate an unsatisfactory visual aspect using an imaging application, such as a photo editing program.

An imaging application can modify a digital image, which is referred to herein as an image, based partially on manual direction or solely automatically. Generally, the more additional information about the image that the imaging application can obtain, the more likely an image modification can be performed automatically without manual direction. Further, additional information about the image can enable a higher quality image to result from the image modification. Additional information about an image can be intrinsic to the image or extrinsic to the image.

An example of intrinsic additional information about an image is a symmetry that is present within the image. Symmetries occur all around us. Both natural organisms, such as plants, animals, inanimate objects, and even the human body, and person-made structures exhibit symmetries in shape, texture, or form. These symmetries result in repetitive visual patterns that play a vital role in the human perception of images. Symmetric repetitions of image patterns can therefore be used as high-level constraints for an underlying image manipulation algorithm to provide some type of enhancement to an image.

To use symmetrically-repeated visual patterns to facilitate manipulation of an image, the symmetries are first discovered within the image. Unfortunately, conventional automated schemes for symmetry detection are limited to only a certain kind of symmetry or a symmetry under a certain condition, such as the absence of perspective distortion. Consequently, conventional approaches to using symmetry for image manipulation rely on human direction to specify a symmetry within the image, or conventional approaches fail to utilize each kind of symmetry that is present within the image. Thus, the former manual option thrusts tedious and repetitive work on an end-user, and the latter automated option produces visually poor results from the image manipulation.

SUMMARY

Image modification using detected symmetry is described. Techniques and systems described herein enable multiple kinds of symmetry to be automatically detected. Examples of general symmetry transformations that can be detected include arbitrary combinations of translation, rotation, scale, and reflection, including under perspective or affine distortion. A system detects repeated symmetry transformations to estimate local symmetries across an image in small regions of the image, where the effects of perspective distortion are less significant. These local symmetries are combined into global symmetries by analyzing a homography, or perspective component of the transformation, that is estimated from the local symmetries over large regions of the image to accommodate the perspective distortion present in the original image. After generation of the global symmetries, the system associates individual pixels of the image that participate in respective global symmetries with one or more of the global symmetries. The image can then be manipulated in the context of the pixel-based global symmetry associations, such as by extending or supporting (e.g., maintaining, reinforcing, strengthening, or enhancing) the global symmetries as part of the image manipulation.

In some example implementations, at least one computing device is operative in a digital medium environment in which images are to be modified using symmetries that are present within the images. The at least one computing device includes a processing system and at least one computer-readable storage medium. The computer-readable storage medium stores multiple modules that are executable by the processing system. The modules include a local symmetry detection module, a local symmetry clustering module, a global symmetry generation module, a global symmetry association module, and an image manipulation module.

The local symmetry detection module detects multiple local symmetries that are present in an original image by discovering repeated correspondences that are each related by a transformation. Each repeated correspondence includes three patches respectively defined by three pixels of the original image, with each patch being related to another of the three patches by a transformation. By focusing at a small-scale level, symmetries can be detected where distortion has less of an effect on the image. The local symmetry clustering module then clusters the multiple local symmetries into symmetry clusters in which each symmetry cluster includes local symmetries corresponding to comparable transformations, such as transformations that are identical to one another.

The global symmetry generation module generates a global symmetry of the original image by analyzing an applicability to the multiple local symmetries of multiple candidate homographies contributed by the multiple local symmetries. The global symmetry generation module can operate on multiple candidate homographies that are contributed on a per-symmetry cluster basis to reduce computational demands. Using, for example, a voting-based consensus analysis, the global symmetry is generated so as to account for large-scale perspective distortion. The global symmetry association module produces a global symmetry association map by associating individual pixels of the original image with a global symmetry indicator for a global symmetry with which the individual pixel participates. The image manipulation module produces a manipulated image by manipulating the original image under global symmetry constraints imposed by the global symmetry association map.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description or in the drawings.

FIGS. 4-1 and 4-2 depict example images for a process in which a global symmetry is discovered for a natural picture of a stained glass window.

FIGS. 6-1 and 6-2 depict example images having an indicated repeated similarity correspondence.

FIG. 10-1 illustrates an example approach to mapping individual pixels to a corresponding global symmetry to produce a global symmetry association map.

FIG. 10-2 depicts examples of support maps for producing or verifying a global symmetry association map.

DETAILED DESCRIPTION

Overview

Figure 1:
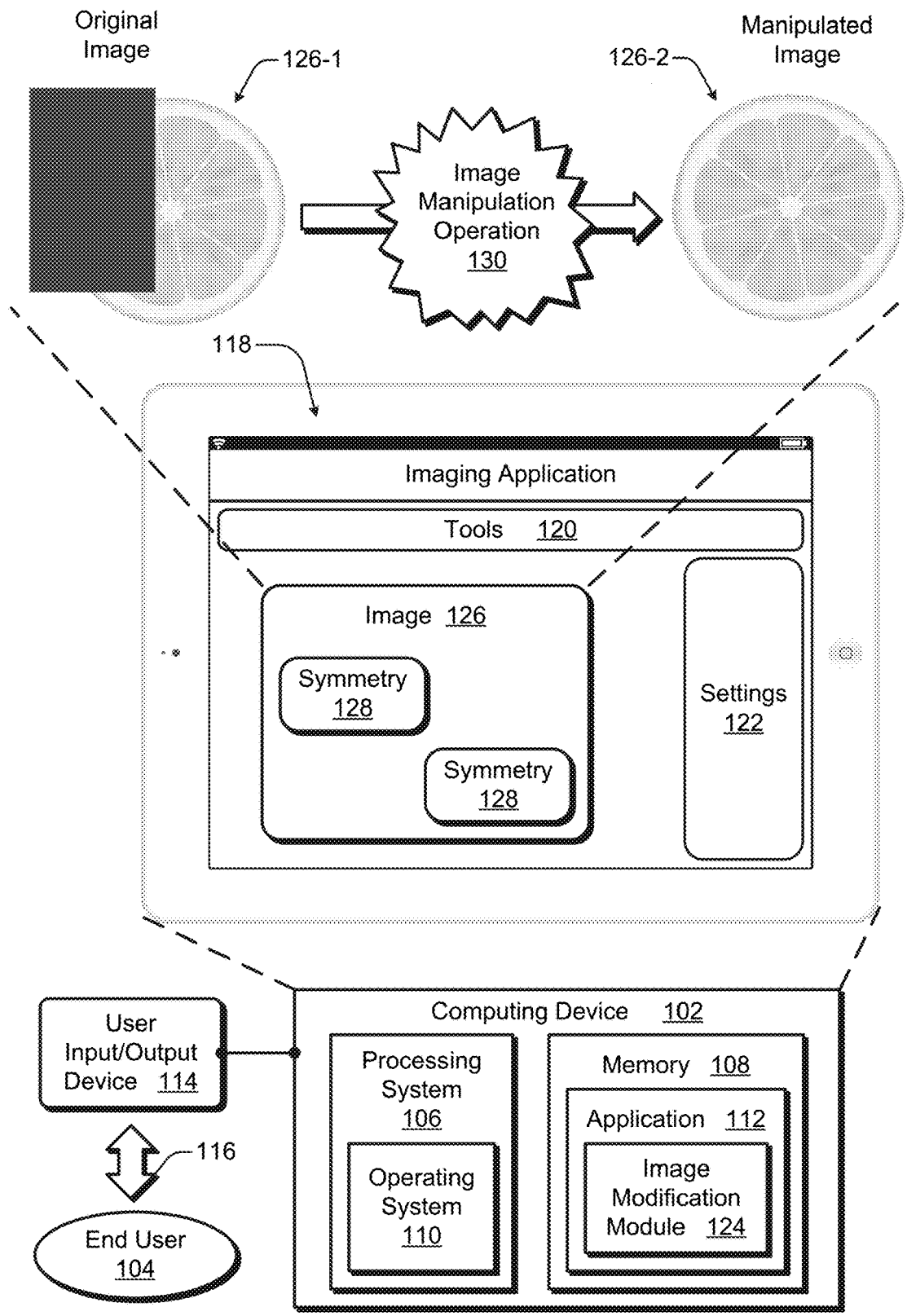
FIG. 1 illustrates an environment having a system for example implementations that are operable to realize image modification using detected symmetry with an image modification module.

Visual patterns that are symmetrically repeated within an image can be used by an image processing system to enhance a modification operation applied to the image. Examples of image modifications include in-painting, perspective correction, image beautification, and segmentation. However, unless an imaging application of an image processing system is to rely on manual input that indicates a location of a symmetry, the imaging application is tasked with first discovering the symmetries within the image. Unfortunately, conventional automated schemes for symmetry detection are limited to only a certain kind of symmetry or a symmetry under a certain condition, such as the absence of perspective distortion.

In contrast, image modification using symmetry detected by an image processing system is described herein. An image modification module executing on the image processing system detects multiple local symmetries within an image using transformations, which can include translation, rotation, reflection, and scale. The local symmetry detection is performed beneath the level of perspective distortion. The image modification module then synthesizes the multiple local symmetries into at least one global symmetry under large-scale perspective distortion. The global symmetry is then associated with individual pixels, and the resulting global-symmetry-to-pixel associations are usable to manipulate the image. By detecting local symmetries using any one or more of various types of transformations and then incorporating large-scale perspective distortion, described techniques can discover multiple kinds of symmetry even in the presence of perspective distortion.

In some example implementations, the image modification module that is executable by the image processing system includes five modules: a local symmetry detection module, a local symmetry clustering module, a global symmetry generation module, a global symmetry association module, and an image manipulation module. The global symmetry generation module includes two modules: a homography extraction module and a global symmetry determination module.

In an example environment, an original image includes at least one symmetry that arises from the constituent pixels of the original image. The symmetries can include local symmetries or at least one global symmetry. In operation, the image modification module starts with the original image and produces a manipulated image based on the at least one global symmetry.

Beginning with the original image, the local symmetry detection module detects multiple local symmetries. Each local symmetry corresponds to a pixel and one or more transformations. A detected local symmetry is represented by a repeatable correspondence that relates similar patches by a transformation. The transformation can entail one or more of, including a combination of, a translation, a rotation, a reflection, a scaling, and so forth. Thus, transformations can include at least any similarity transformation. The local symmetry detection module detects local symmetries using patches of the image on a pixel-by-pixel basis. If at least three sufficiently-similar patches are related by a single transformation between the three patches, the transformation is deemed to represent a local symmetry with regard to the pixel under consideration.

The local symmetry detection module searches for similar patches on a pixel-by-pixel basis across the original image. To avoid considering flat patches with little visual structure, pixels corresponding to non-salient patches may be disregarded. The local symmetry detection module can search for similar patches that are related by a transformation by incorporating, for instance, principles used by the General PatchMatch (GPM) algorithm. Multiple pixels of the original image keep track of the top n corresponding transformations, with n representing some integer such as ten. Transformations are obtained for similarity analysis at each pixel under consideration using a neighbor propagation mechanism and a random search mechanism.

With the random search mechanism, new transformations can be obtained by sampling pixels that are randomly selected in the pixel space, with the new transformations derivable from the randomly-selected pixels. Acceptable new transformations are tagged with a transformation identifier. With the neighbor propagation mechanism, suggested transformations can be obtained from recommendations made by neighboring pixels. The suggested transformation is provided along with the transformation identifier so that identical transformations can be ascertained subsequently. A similarity analysis is performed on corresponding patches, with the analysis including a similarity-based cost indicator. Based on the cost indicator of the similarity analysis, each pixel tracks the top n corresponding transformations, with each transformation representative of a patch-based local symmetry.

The local symmetry clustering module uses the transformations to cluster the pixels associated with a local symmetry into symmetry clusters. Comparable transformations are ascertained. Comparable transformations include those that are identical as evidenced by the transformation identifiers. Comparable transformations can also include those transformations that are sufficiently similar to each other so as to be non-distinct, as described herein in terms of mutual distance. Thus, the local symmetry clustering module clusters the pixels corresponding to the comparable transformations together into a symmetry cluster, with each symmetry cluster corresponding to a cluster-level transformation. In an example approach, if a pixel has inherited from a neighboring pixel a transformation identifier along with a given transformation, the transformation identifier can be used to cluster the pixels into the same symmetry cluster. By clustering the pixel-based local symmetries into symmetry clusters, subsequent processing can be reduced to manage the temporal or processing resources expended to generate global symmetries.

The global symmetry generation module generates multiple global symmetries by extracting homographies and determining the global symmetries based on the extracted homographies. A homography represents a perspective component of a transformation applied to an image. To extract a homography, the homography extraction module uses the multiple transformations that are associated with each pixel at the local symmetry level. If the pixels are clustered into symmetry clusters, this homography extraction is expedited because fewer sets of different transformations are part of the computation.

For each given non-global symmetry, whether corresponding to individual pixels (e.g., a local symmetry) or pixel clusters (e.g., a symmetry cluster), the homography extraction module estimates a corresponding homography from the transformations of the given non-global symmetry. Any two transformations in each set of transformations for a given non-global symmetry can be used to produce a candidate homography, which is indicative of a vanishing point or how a scene may be retreating into the distance. Each non-global symmetry can therefore contribute at least one respective candidate homography for consideration in determining a global symmetry.

In an example approach, a voting arrangement is employed to arrive at a consensus and thereby determine at least one global symmetry for the original image from multiple candidate homographies contributed by non-global symmetries. An example voting arrangement can be implemented using a RANdom SAmple Consensus (RANSAC)-based algorithm. A RANSAC-based algorithm is generally capable of applying order to a collection of data while excluding or reducing the effect of the outliers in the data on the model being derived. The global symmetry determination module analyzes the homography votes from individual pixels of the non-global symmetries to ascertain how many other symmetries are applicable to (e.g., align with) each contributed homography. The global symmetry determination module iterates on the homography candidates until at least one homography represents a consensus, which is used to determine the global symmetry corresponding thereto.

A global symmetry can therefore incorporate multiple instances of local symmetries and consequently extend across a range of regions that are distorted due to perspective effects. However, not every pixel participates in each global symmetry. Some pixels participate in no global symmetries, some participate in a single global symmetry, and some participate in multiple global symmetries, such as if two symmetries are nested. To accommodate these possibilities and prepare the global symmetry information for subsequent use with an image manipulation operation, a pixel-to-global symmetry mapping is performed. To do so, the global symmetry association module associates each respective pixel with at least one indication of a corresponding global symmetry with which the respective pixel participates. This association of pixels to respective global symmetries produces a global symmetry association map.

The global symmetry association map, which includes the pixel-to-global symmetry associations, is passed to the image manipulation module. The image manipulation module performs the image manipulation operation on the original image to produce the manipulated image based on the global symmetry association map. For example, the image manipulation module can perform the image manipulation using the associations of the global symmetry map as a set of constraints on the manipulation. An association of a global symmetry at a given pixel can be used, for instance, to propagate an appearance of a patch surrounding the given pixel into a region of the original image having an appearance that is affected by an occluding object. Thus, by deriving a global symmetry from multiple local symmetries, multiple different kinds of symmetries can be discovered in an image, including under affine or perspective distortion, for use in image manipulation operations.

In the following discussion, after some example terminology is set forth, an example environment is described that may employ the techniques described herein. Example embodiment systems, apparatuses, and techniques are then described, followed by a section explaining example embodiment procedures. The procedures may be performed in the example environment and systems as well as in other environments and systems. However, performance of the example procedures is not limited to the example environment and systems, and the example environment and systems are not limited to performance of the example procedures.

TERMINOLOGY EXAMPLES

Example descriptions or explanations of certain terms as used herein are set forth below. Each term is applicable to one or more, but not necessarily all, implementations presented herein. Some terms are further elucidated using one or more examples.

A "local symmetry" refers to a small-scale symmetry in which visual patterns are symmetrically repeated within an image. A local symmetry may be sufficiently small so as to avoid being substantially affected by distortion within the image. A local symmetry can be represented by a repeated correspondence that includes a transformation. A "repeated correspondence" refers to three or more patches of an image that are similar to each other based on some similarity metric. The three patches are related by a transformation.

A "patch" refers to a portion of an image formed from constituent pixels of the image. At least one pixel of the patch, such as a central pixel, may define a location of the patch. A patch may be any size or shape. An example of patch, however, is a rectangular grid of pixels, such as a 7×7 square. A "transformation" refers to a movement of a locus of pixels, such as a patch, over an image. Examples of similarity transformations include translations, reflections, rotations, scalings, and combinations thereof. Applying a transformation, in a backwards or forwards direction, to a patch of a repeated correspondence yields another patch of the repeated correspondence.

A "homography" refers to a perspective component of an image transformation. A perspective component can be indicative of a vanishing point or how a scene appears to be retreating into the distance. A homography relates to how a suitable transformation is affected by a perspective distortion present across an image on a global basis. A "global symmetry" refers to a large-scale symmetry in which repeated visual patterns extend across an image, such as sufficiently far so as to be affected by a perspective distortion in the image. A global symmetry can be derived from multiple local symmetries. A "global symmetry association map" refers to a set of associations that link pixels or sets of pixels to at least one global symmetry. A global symmetry association map can be used to provide constraints on an image manipulation operation.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example implementations that are operable to realize image modification using detected symmetry with an image modification module 124. As illustrated, the example system 100 includes at least one computing device 102 and at least one user input/output (I/O) device 114. The computing device 102 includes a processing system 106 and a memory 108. The processing system 106 includes an operating system 110. The memory 108 stores an application 112, which includes the image modification module 124. Example implementations for the computing device 102 and the image modification module 124 are described further below in this section. For the example environment, FIG. 1 depicts an end user 104 and a user interaction between the end user 104 and the user I/O device 114 that produces a user control signal 116. The environment further includes an image 126 having at least one symmetry 128.

As shown on a display screen associated with the computing device 102, the application 112 may be realized as some kind of an imaging application, such as a photo editing application, a graphic design application, or a presentation creation application. The imaging application processes or displays an image 126 responsive to user input realized as the user control signal 116. For example, the imaging application empowers the end user 104 to have the computing device 102 modify the image 126 by changing the shape or size of the image, by improving the visual quality of the image, by rearranging interior portions of the image, by filling in missing portions of the image, some combination thereof, and so forth.

The computing device 102 provides a user interface 118 that presents output to the end user 104 or accepts input from the end user 104. To enable the end user 104 to instruct the computing device 102 to modify an image 126, the imaging application provides a number of tools 120. Examples of tools 120 include selection, painting, and drawing tools. To enable the end user 104 to easily see a current condition of an image 126 or a current state of a tool 120, the imaging application displays a number of settings 122. Examples of settings 122 include a color palette, an active manipulation operation, and layers. However, the tools 120 or the settings 122 can be arranged in alternative manners. Although shown in the context of a device that enables touch-screen interaction, the tools 120, the settings 122, etc. of the imaging application can alternatively be utilized via a mouse, a touchpad, voice interaction, or some combination thereof.

Generally, the image modification module 124 can perform an image manipulation operation 130 on the image 126 responsive to user input and based on one or more symmetries 128 that exist within the image 126. As described herein, a symmetry 128 can include a local symmetry or a global symmetry. Examples of image manipulations include in-painting, perspective correction, image beautification, segmentation, or combinations thereof. An example image manipulation operation 130 is shown at the top of the example environment as an image completion operation. An original image 126-1 includes a slice of lemon in which a portion of the lemon is obscured by an occluding object, such as a finger over the lens, which is depicted as a dark grey rectangle. In an example operation, the image modification module 124 analyzes the original image 126-1 to discover at least one symmetry 128 therein, such as the radial or rotational symmetry of the lemon wedges. The image modification module 124 uses the discovered symmetry 128 to complete the lemon in the regions obscured by the occluding object to produce a manipulated image 126-2.

The computing device 102 can be implemented as any suitable type of computing device. Examples of end-user implementations for the computing device 102 include a desktop computer, a laptop or notebook computer, a mobile device (e.g., assuming a handheld configuration such as a mobile phone, a phablet, or a tablet—which is depicted in FIG. 1), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 106, an example of a computer-readable storage medium illustrated as memory 108, and so forth. Other hardware components are also contemplated as described herein with reference to FIG. 14. The processing system 106 is representative of functionality to perform operations through execution of instructions stored in the memory 108. Although illustrated as two separate components, functionality of the processing system 106 and the memory 108 may be combined into one component (e.g., on an application specific integrated circuit (ASIC) or as instructions are loaded from the memory onto a processor) or may be further divided into a greater number of components. Examples of a user I/O device 114 include a keyboard, a mouse, a touchpad, a touch screen, a microphone, a camera, a display device such as a screen or projector, a speaker, or some combination thereof. The user I/O device 114 may be separate from or integrated with the computing device 102. The computing device 102 is further illustrated as including an operating system 110. The operating system 110 is configured to abstract underlying hardware functionality of the computing device 102 to the application 112 that is executable on the computing device 102.

In example implementations, the image modification module 124 is located at or executing on the computing device 102, such as by being part of the application 112 or the operating system 110. The image modification module 124 represents functionality to implement schemes and techniques for image modification using detected symmetry as described herein. The image modification module 124 can be implemented as at least part of a software package that executes on and specially configures one or more processors, which processors may physically realize the processing system 106; as a hardware apparatus, which may be realized as an ASIC or as the computing device 102; or using a combination of software, firmware, hardware, or fixed logic circuitry; with some combination thereof; and so forth. As described herein with reference to FIG. 14, the image modification module 124 may be fully or partially implemented as a web or cloud based image-processing-oriented service.

Systems and Techniques

Figure 2:
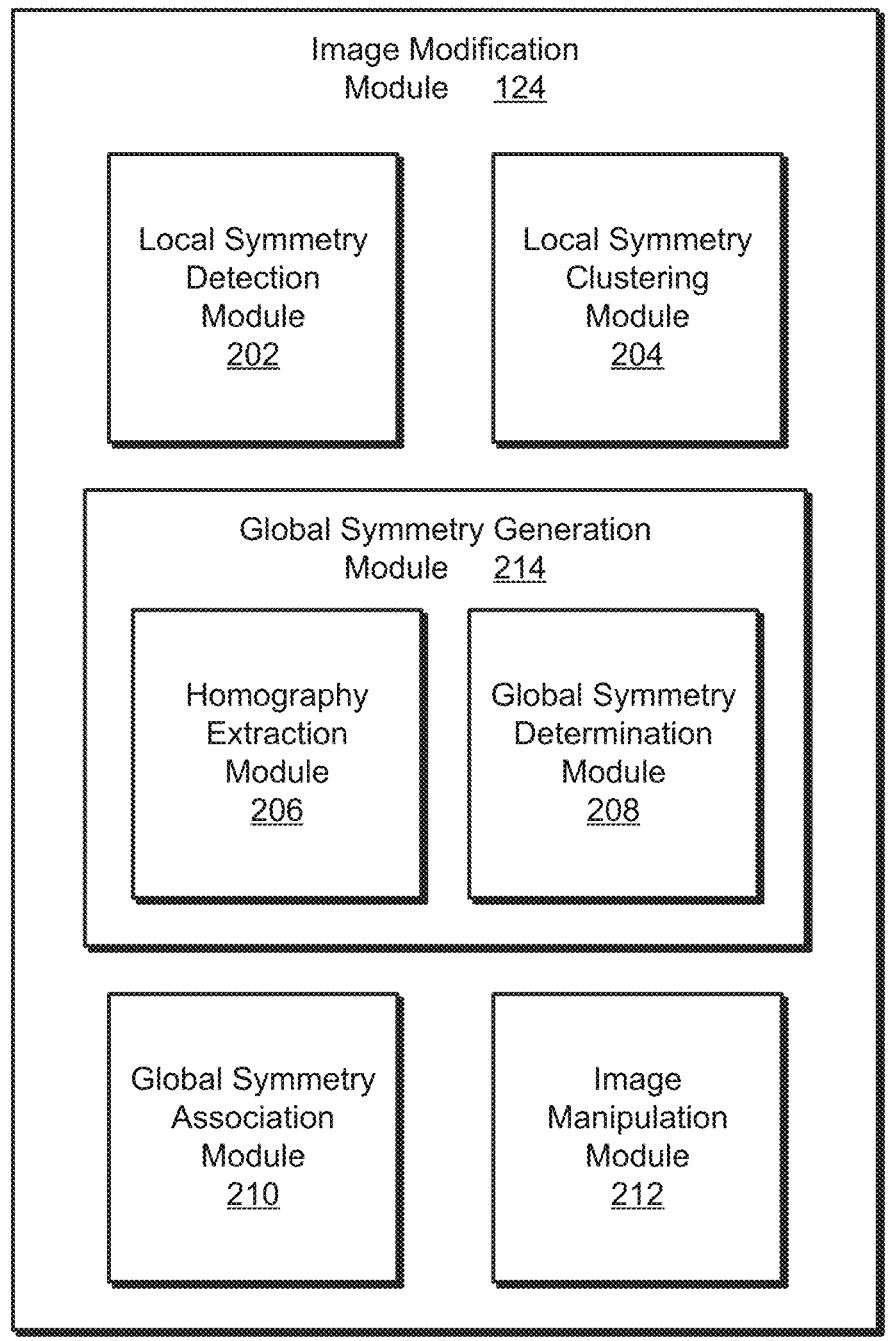
FIG. 2 illustrates an example implementation for the image modification module.

FIG. 2 illustrates an example implementation for the image modification module 124. The image modification module 124 includes a local symmetry detection module 202, a local symmetry clustering module 204, a global symmetry generation module 214, a global symmetry association module 210, and an image manipulation module 212. The global symmetry generation module 214 includes a homography extraction module 206 and a global symmetry determination module 208. Operations of these modules are described generally with reference to FIG. 2, and more specifically with reference to FIG. 3 and succeeding figures.

In some implementations, the local symmetry detection module 202 is configured to detect multiple local symmetries in an original image by discovering repeated correspondences that are each related by a transformation. Each repeated correspondence includes three patches respectively defined by three pixels of the original image. The local symmetry clustering module 204 is configured to cluster the multiple local symmetries into symmetry clusters in which each symmetry cluster includes local symmetries corresponding to a comparable transformation.

The global symmetry generation module 214 is configured to generate a global symmetry of the original image by analyzing an applicability to the multiple local symmetries of multiple candidate homographies contributed by the multiple local symmetries. The global symmetry generation module 214 can be configured to operate on multiple candidate homographies that are contributed on a per-symmetry cluster basis to manage computational demands.

The homography extraction module 206 is configured to extract the multiple candidate homographies from the multiple local symmetries using multiple transformations corresponding to each respective local symmetry. And the global symmetry determination module 208 is configured to determine the global symmetry by reaching a convergence on a consensus homography across the multiple local symmetries.

The global symmetry association module 210 is configured to produce a global symmetry association map by associating individual pixels of the original image with a global symmetry indicator. The image manipulation module 212 is configured to produce a manipulated image by manipulating the original image under global symmetry constraints imposed by the global symmetry association map.

Figure 3:
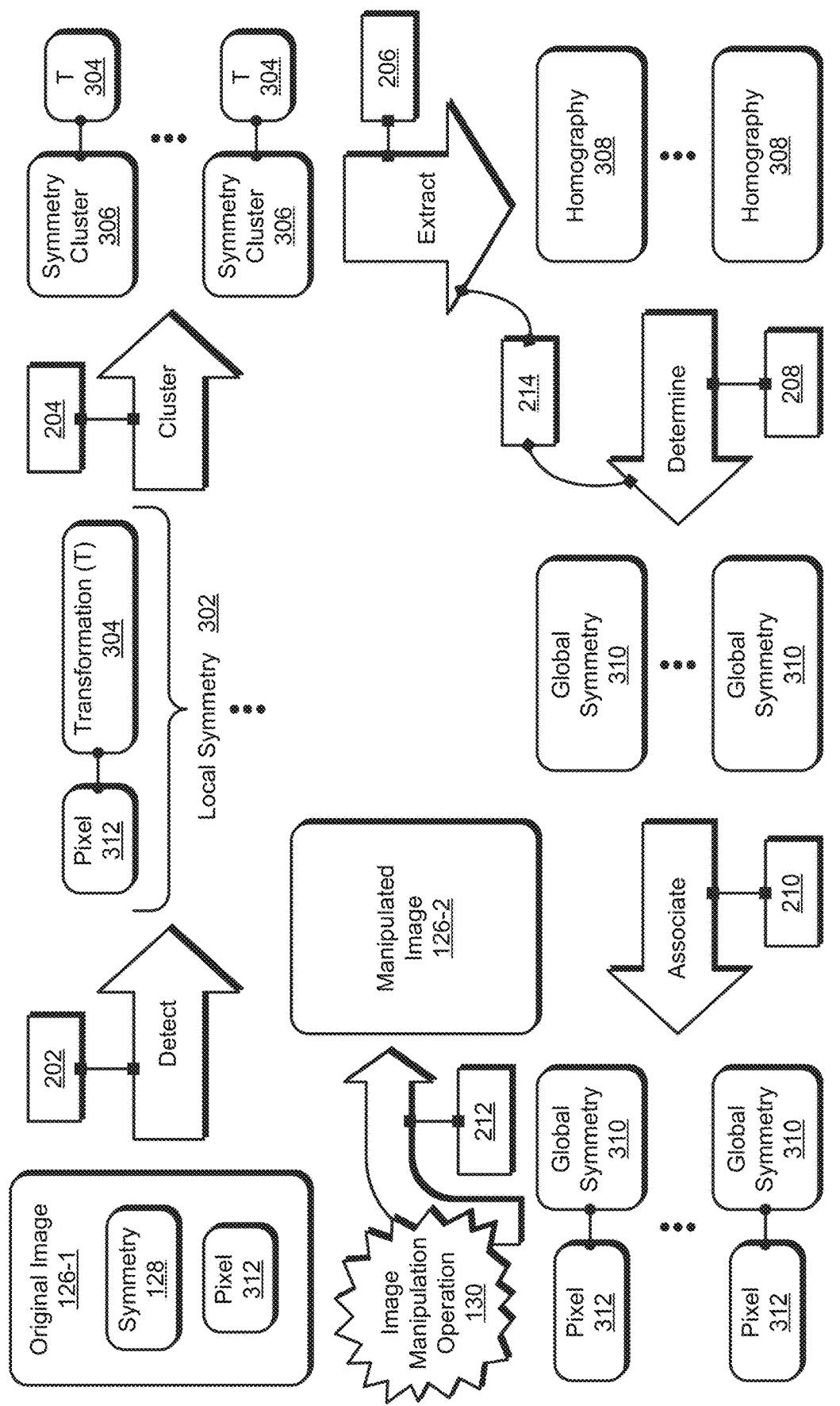
FIG. 3 illustrates an example scheme for image modification using detected symmetry.

Operation of individual ones of these modules 202-214 are described for an example scheme at a relatively high level with reference to FIG. 3. After the description of FIG. 3, a subsection entitled "Local Symmetry Formulation" describes aspects for characterizing the presence of a local symmetry. Additional details at a relatively low level are set forth further below in respective subsections entitled "Local Symmetry Detection," "Local Symmetry Clustering," "Global Symmetry Generation," "Global Symmetry Association," and "Image Manipulation."

FIG. 3 illustrates an example scheme 300 for image modification using detected symmetry. At the top left corner of FIG. 3, an original image 126-1 is shown having one or more symmetries 128 that arise from the constituent pixels 312 of the original image 126-1. The symmetries 128 can include one or more local symmetries 302 and at least one global symmetry 310. The process for the scheme 300 starts at the original image 126-1 and proceeds in a clockwise direction. The scheme 300 ends with the production of a manipulated image 126-2 based on at least one global symmetry 310.

Beginning with the original image 126-1, the local symmetry detection module 202 detects multiple local symmetries 302. Each local symmetry 302 corresponds to a pixel 312 and one or more transformations 304. A detected local symmetry 302 is represented by a repeatable correspondence that relates different similar patches by a transformation 304. The transformation 304 can entail one or more of, including a combination of, a translation, a rotation, a reflection, a scaling, and so forth. Thus, transformations 304 can include at least any similarity transformations. The local symmetry detection module 202 detects local symmetries 302 using patches on a pixel-by-pixel basis. If at least three sufficiently-similar patches are related by a single transformation 304 between the three patches, the transformation 304 is deemed to represent a local symmetry 302 at the pixel 312 under consideration.

The local symmetry detection module 202 searches for similar patches on a pixel-by-pixel basis. To avoid considering flat patches with little visual structure, pixels 312 corresponding to non-salient patches may be disregarded. The local symmetry detection module 202 can search for similar patches that are related by a transformation 304 by incorporating, for instance, principles used by the General PatchMatch (GPM) algorithm. Multiple pixels 312 of the original image 126-1 keep track of the top n corresponding transformations 304, with n representing some integer such as ten. New transformations are obtained for testing at each pixel 312 using a nearest neighbor mechanism or a random search mechanism. With the random search mechanism, new transformations can be obtained by searching in the pixel space, with new transformations derivable from the randomly-selected pixels. Based on a similarity analysis of corresponding patches that includes a similarity-based cost indicator, each pixel 312 tracks the top n corresponding transformations 304, with each transformation 304 representative of a patch-based local symmetry 302.

The local symmetry clustering module 204 uses the transformations 304 to cluster the pixels associated with a local symmetry 302 into symmetry clusters 306. Transformations 304 that are identical, or at least sufficiently similar to each other so as to be non-distinct, are ascertained. The pixels 312 corresponding to the similar transformations 304 are clustered together into a symmetry cluster 306, with each symmetry cluster 306 corresponding to a cluster-level transformation 304. In an example approach, each transformation 304 is associated with an identifier during the searching of the local symmetry detection stage. If a pixel 312 inherits a transformation 304 from a neighboring pixel, the pixel 312 also inherits the associated identifier. These identifiers can be used to cluster the pixels 312 into the symmetry clusters 306. By clustering the pixel-based local symmetries 302 into symmetry clusters 306, subsequent processing is reduced to manage the temporal or processing resources expended to generate global symmetries 310.

The global symmetry generation module 214 generates multiple global symmetries 310 by extracting homographies and determining the global symmetries 310 based on the extracted homographies. A homography represents a perspective component of a transformation on an image, which transformation can be impacted by a perspective distortion originally present in the image. To extract a homography 308, the homography extraction module 206 uses the multiple transformations 304 that are associated with each pixel 312 at the local symmetry level. If the pixels 312 are clustered into symmetry clusters 306, this homography extraction is expedited because fewer sets of different transformations 304 are part of the computation.

For each given non-global symmetry, whether corresponding to individual pixels (e.g., a local symmetry 302) or pixel clusters (e.g., a symmetry cluster 306), the homography extraction module 206 estimates a corresponding homography 308 from the transformations 304 of the given non-global symmetry. Any two transformations 304 in each set of transformations 304 for a given non-global symmetry are used to produce a candidate homography 308, which is indicative of a vanishing point or how a scene may be retreating into the distance. Each non-global symmetry can therefore contribute at least one respective homography 308 for consideration in determining a global symmetry 310.

In an example approach, a voting arrangement is employed to arrive at a consensus and thereby democratically determine at least one global symmetry 310 for the original image 126-1 from multiple candidate homographies 308 contributed by non-global symmetries. An example voting arrangement can be implemented using a RANdom SAmple Consensus (RANSAC)-based algorithm. A RANSAC-based algorithm is generally capable of applying order to a collection of data while excluding or reducing the effect of the outliers in the data on a model being derived.

The global symmetry determination module 208 analyzes the homography votes from individual pixels 312 of the non-global symmetries to ascertain how many other symmetries align with each contributed homography 208. The global symmetry determination module 208 iterates on the homography candidates until at least one homography 308 represents a consensus to thereby determine the global symmetry 310 corresponding thereto.

A global symmetry 310 can incorporate multiple instances of local symmetries 302 and therefore extend across a range of regions that are distorted due to perspective effects. However, not every pixel 312 participates in each global symmetry 310. Some pixels 312 participate in no global symmetries 310, some participate in a single global symmetry 310, and some participate in multiple global symmetries 310. To accommodate these possibilities and prepare the global symmetry information for subsequent use with an image manipulation operation 130, a pixel-to-global symmetry mapping is performed. To so do, the global symmetry association module 210 associates each respective pixel 312 with at least one indication of a corresponding global symmetry 310 with which the respective pixel 312 participates. This association of pixels 312 to respective global symmetries 310 produces a global symmetry association map.

The global symmetry association map, which includes the pixel-to-global symmetry associations, is passed to the image manipulation module 212. The image manipulation module 212 performs the image manipulation operation 130 on the original image 126-1 to produce the manipulated image 126-2 based on the global symmetry association map. For example, the image manipulation module 212 can perform the image manipulation using the associations of the global symmetry map as a set of constraints on the manipulation. For instance, an association of a global symmetry 310 at a given pixel 312 can be used to propagate an appearance of a patch surrounding the given pixel 312 into a region of the original image 126-1 having an appearance that is affected by an occluding object.

Figures 1, 4:
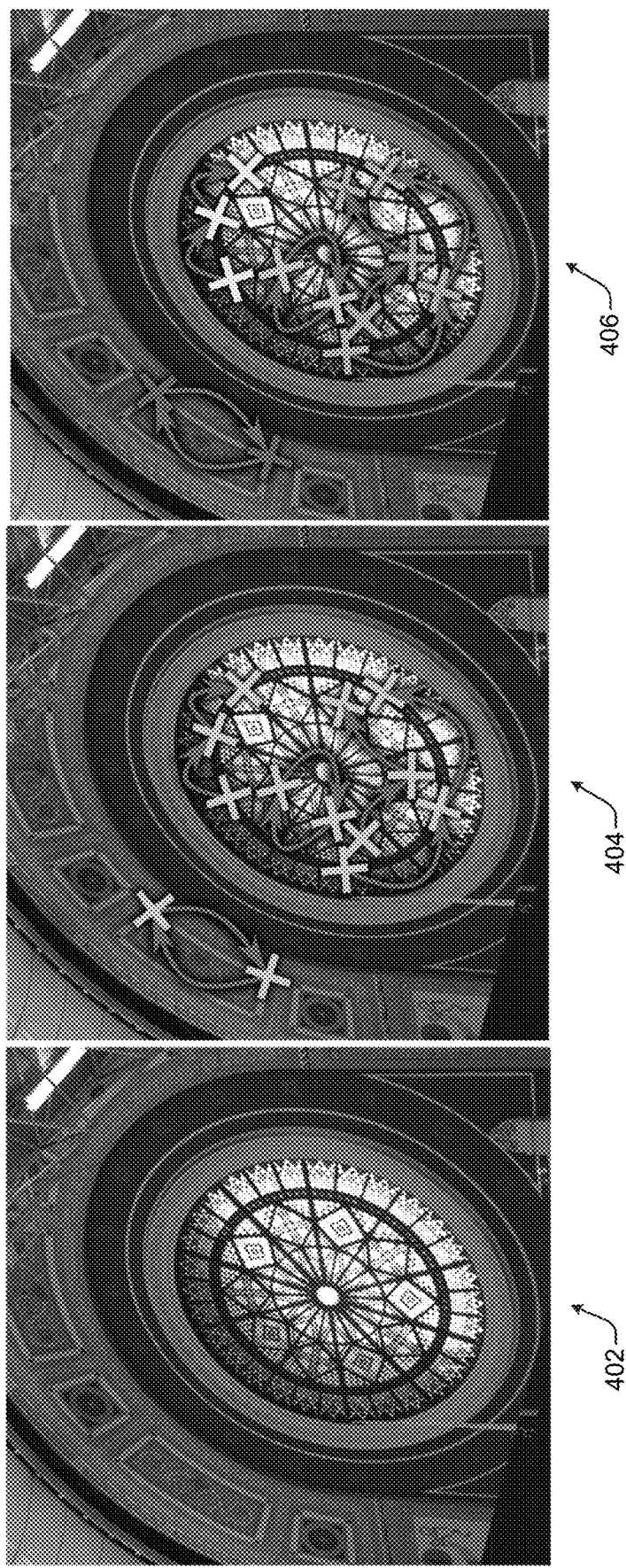
Figures 2, 4:
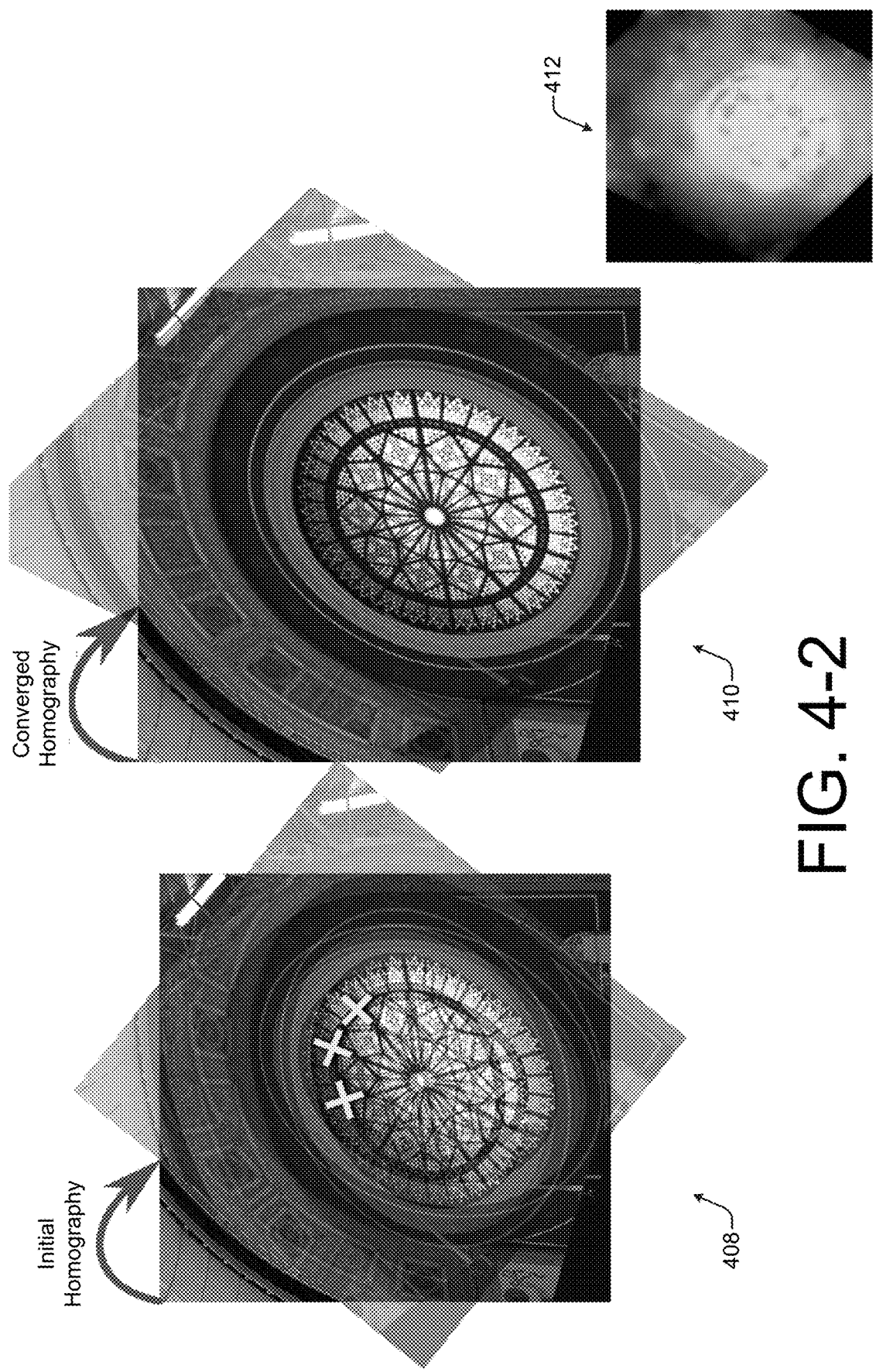

FIGS. 4-1 and 4-2 depict example images 402-412 for a process in which a global symmetry is discovered for a natural picture of a stained glass window. The image 402 in FIG. 4-1 shows the stained glass window in an original image form. Generally, region-wise dense local symmetries are first detected in the image plane at a sufficiently small scale so as to likely avoid the effects of perspective distortion. From these dense local symmetries, out-of-plane global symmetries are deduced that account for perspective distortion.

As shown in the image 404, dense repeatable similarity correspondences are detected. These dense repeatable similarity correspondences are represented by "plus" symbols having the same gray shade and arrows pointing between the plus symbols, with the arrows representing transformations. In the image 406, the dense similarity correspondences are clustered into clusters for each of the same transformations that are to be represented by one of these clusters. Each respective cluster in the image 406 is represented by a different respective shade of gray for the plus symbols.

Continuing with FIG. 4-2, respective ones of the various transformations of the clusters are individually extended to respective general homographies, as shown by the image 408. The image 408 represents an initial homography. The candidate homographies are investigated to seek a locally optimal fit. The investigation eventually surfaces a converged homography in accordance with a corresponding global symmetry as revealed in the image 410. In this example, the converged homography is particularly apparent along the outer rim of the stained glass window. A verification or fit map that is indicative of the accuracy of the discovered global symmetry is shown in the image 412.

Local Symmetry Formulation

Figure 5:
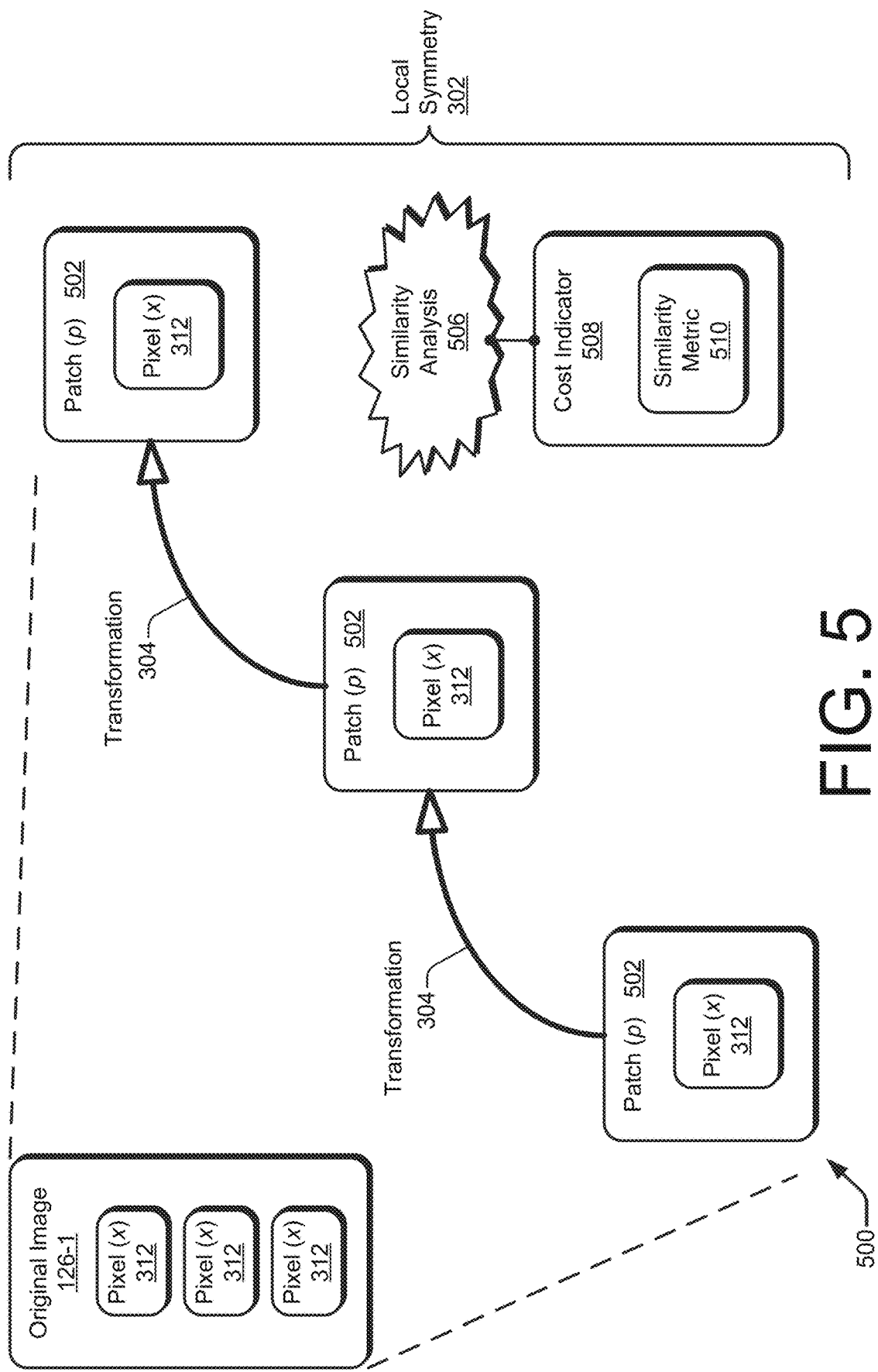
FIG. 5 illustrates an example of a repeated similarity correspondence that is representative of a local symmetry.

FIG. 5 illustrates an example of a repeated similarity correspondence 500 that is representative of a local symmetry 302. As shown, the repeated similarity correspondence 500 includes multiple pixels 312, multiple patches 502, and multiple transformations 304. The pixels 312 are part of the original image 126-1. Each pixel 312 can represent or define a location of a patch 502, with each patch including multiple pixels 312, such as a grid of pixels. A rectangular grid of pixels can be any size, such as a square grid having 7×7 pixels. However, a patch 502 can have other sizes or shapes. Detecting the repeated similarity correspondence 500 entails at least one similarity analysis 506 that is based on a cost indicator 508.

In a quantitative sense, a symmetry, such as a local symmetry, is explained herein in terms of at least one point and correspondences between multiple points, with each point being represented in an image by a pixel x. A correspondence is interpreted as some transformation T such that it warps the image patch $p_x$ to another patch $T(p_x)$ so that the dissimilarity, or distance $d(p_x,T(p_x))$, between the two patches is low.

Figure 6:
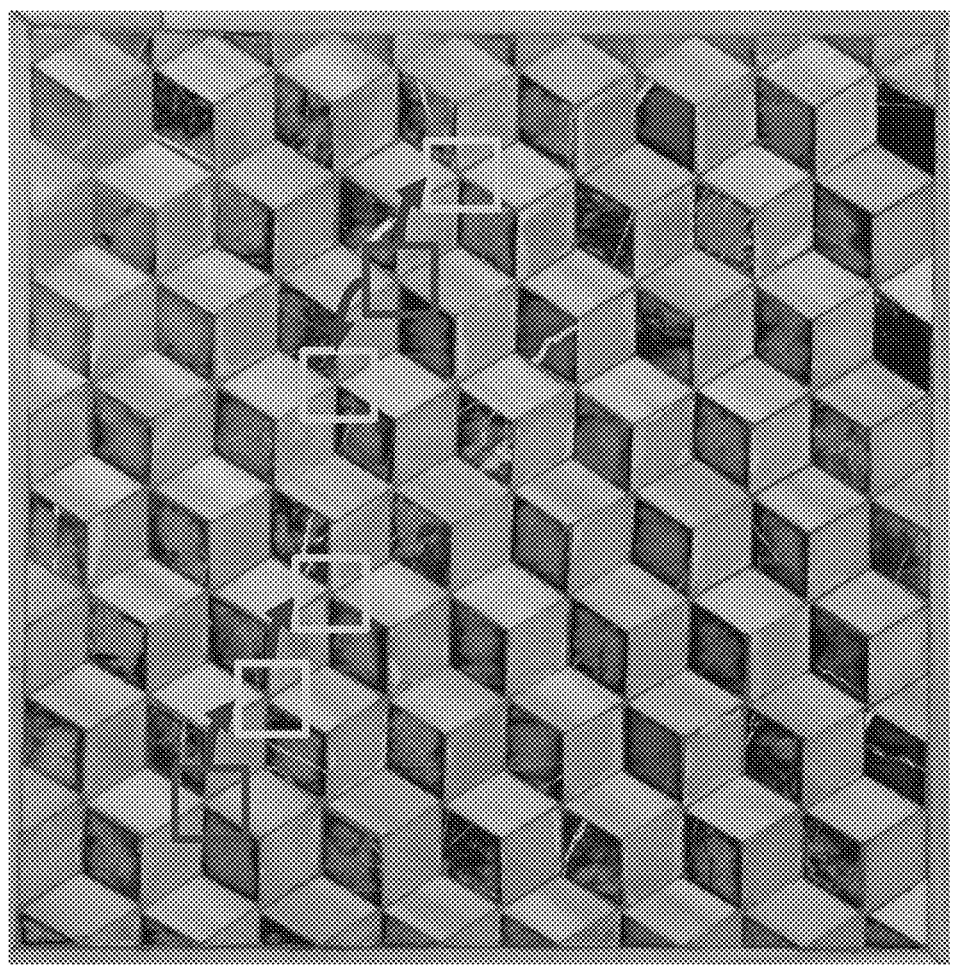
Figure 1:
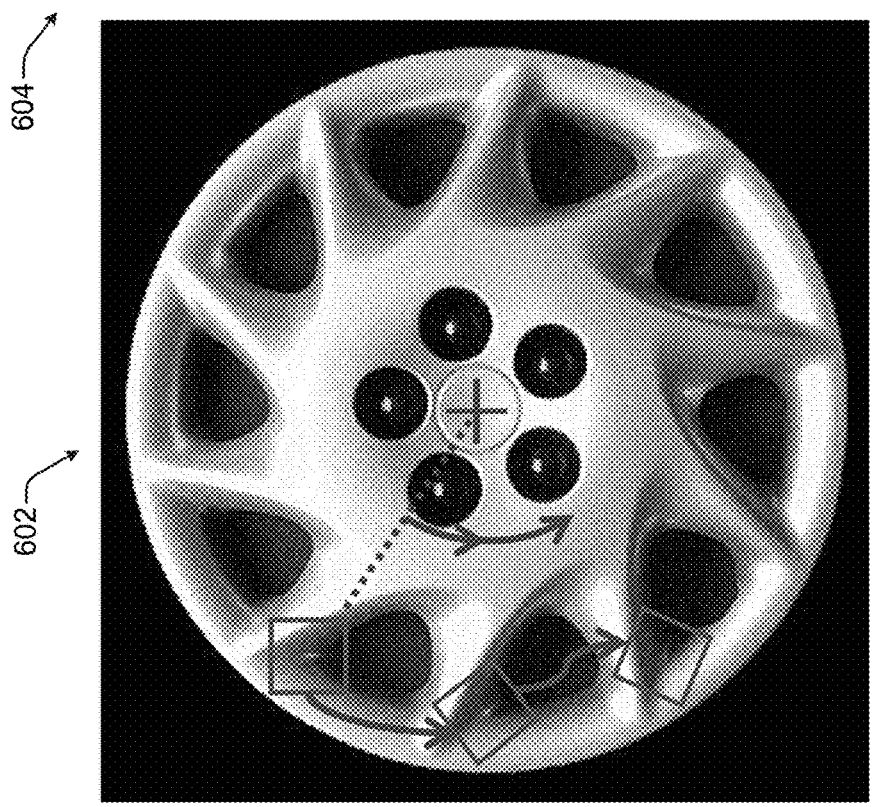
Figures 2, 6:
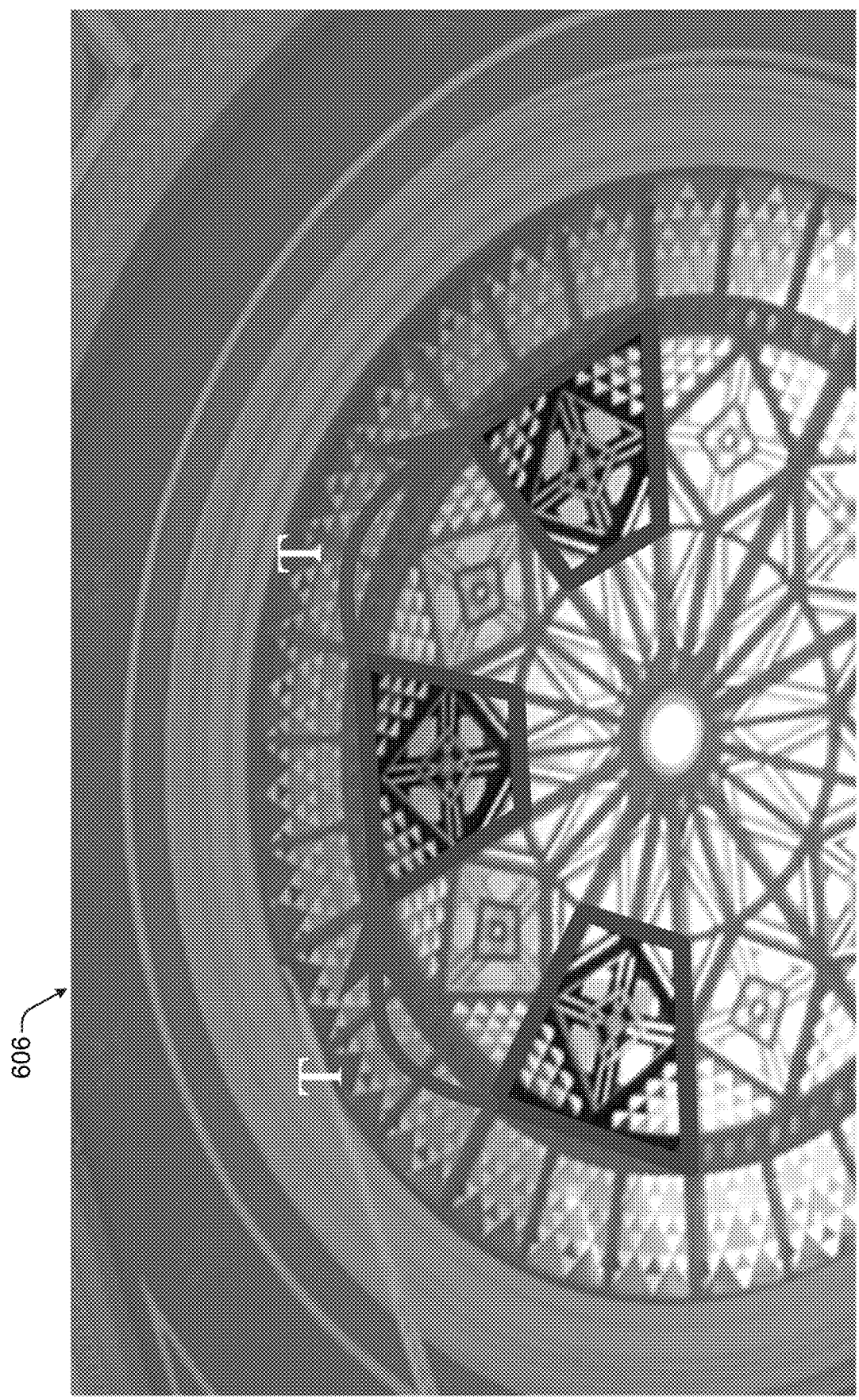

Likewise, we call a correspondence a symmetry if both $d(p_x,T(p_x))$ and $d(p_x,T(T(p_x)))$ are low. Visual examples of such symmetries are shown in FIGS. 6-1 and 6-2. In other words, a symmetry is a repeatable correspondence. This repeatable correspondence can be based on any non-degenerate transformation. However, the examples described herein focus on a specific set of classes of transformations, namely similarity transformations, for the sake of clarity.

This pixel or patch-based interpretation of local symmetry differs from the conventional definition of symmetry group theory in which a symmetry is considered to be a global isomorphism rather than being evaluated at a point. Because implementations that are described herein can be applied to natural images instead of merely infinite fields, these natural images are evaluated in a local context. This local context evaluation involves both the correspondence-based explanation of local symmetry and a process to evaluate the area over which a symmetry applies.

The description of a local symmetry provided above is used to formulate and quantify the cost of a local symmetry at a pixel in terms of a similarity analysis 506. The similarity analysis is based on a cost indicator 508. The cost indicator is based on at least one similarity metric 510, which can be equivalently computed using a dissimilarity metric. Although other similarity metrics can be used, an example dissimilarity metric is the Sum of Squared Differences (SSD). The SSD metric can therefore be used as a measure of patch-to-patch dissimilarity. Thus, the cost indicator (c) 508 of a candidate transform T at patch $p_x$ can be measured using an energy function as shown in Equation (1):

$$c(T,p) = \max(\text{SSD}(p_x,T(p_x)), \text{SSD}(T(p_x),T^2(p_x))). \quad (1)$$

The cost of a candidate transformation 304 for a pixel 312 under consideration is described further below with reference to FIG. 7.

The transformations 304 can be made in any direction, such as forwards or backwards. More specifically, without loss of generality, the triplet $\{p_x, T(p_x), T^2(p_x)\}$ can be substituted with $\{T^{-1}(p_x), p_x, T(p_x)\}$ or $\{T^{-2}(p_x), T^{-1}(p_x), p_x\}$. This merely has the effect of changing which of the three corresponding pixels is considered the origin. Taking the minimum of the cost over these three triplets enables propagation of the symmetry to the edges of a symmetric region of an image. Further, if T is a symmetry, so is $T^{-1}$, so transformations 304 that are inverses of one another can be considered to be the same, just applied in a different direction.

FIGS. 6-1 and 6-2 depict example images 602-606 having an indicated repeated similarity correspondence, such as the repeated similarity correspondence 500 of FIG. 5. The images 602 and 604 of FIG. 6-1 depict small scale symmetries, and the image 606 of FIG. 6-2 depicts a medium scale symmetry. Each image includes a shape, such as a square or a trapezoid, that highlights the repeated portion of the picture. Each image also includes an arrow representative of a translation relating one portion to another portion. The image 602 shows a wheel that exhibits radial symmetry. The image 604 shows a geometric pattern that exhibits translational symmetry. The image 606 shows part of the stained glass window of FIGS. 4-1 and 4-2, which exhibits radial symmetry.

Local Symmetry Detection

To facilitate the task of finding dense correspondences by making the process computationally tractable, the Generalized PatchMatch (GPM) algorithm is expanded and enhanced. Generally, a search is conducted for dense repeatable similarity correspondences that represent local symmetries. In an example implementation, the focus of the search is for similarity transformations because a manageable patch size is likely to be too small to infer perspective effects. In such implementations, the search is effectively restricted to image-plane symmetries. However, these are then extended into non-fronto-parallel planes for at least one global symmetry.

More specifically, the searching algorithm is built upon the k-Nearest Neighbor (NN) GPM for generalized transformations, which is expanded by incorporating Equation (1) above. However, the search space for finding local symmetries is more sparse than a conventional GPM environment because there are fewer local symmetries with the attendant transformations than mere correspondences. Consequently, using a brute force approach for the random sampling step in conventional GPM to find the transformations for the local symmetries would cause unreasonable program runtimes. To make this search practical, the GPM algorithm is modified as follows: First, the transformation is parameterized in such a way that the parameters are meaningfully interpretable as sets of points in image space. Second, we take advantage of this parametrization to alter the random search mechanism such that the pixels of the image serve as the search space. This results in a faster convergence because each potential correspondence that is investigated actually exists within the image. This is in contrast with an approach in which the potential transformations serve as the search space, which can warp to "patches" that are outside the bounds of the image.

In operation, a patch (e.g., a 7×7 pixel patch) is used in the search for each second pixel while maintaining a queue of n best repeatable correspondences (e.g., with n=10). This queue keeps transformations that are both sufficiently distinct from each other as well as from the identity transformation; other transformations can be discarded. To compute a relative similarity metric between transformations, an image space measure is used, as is described below in this subsection.

Figure 7:
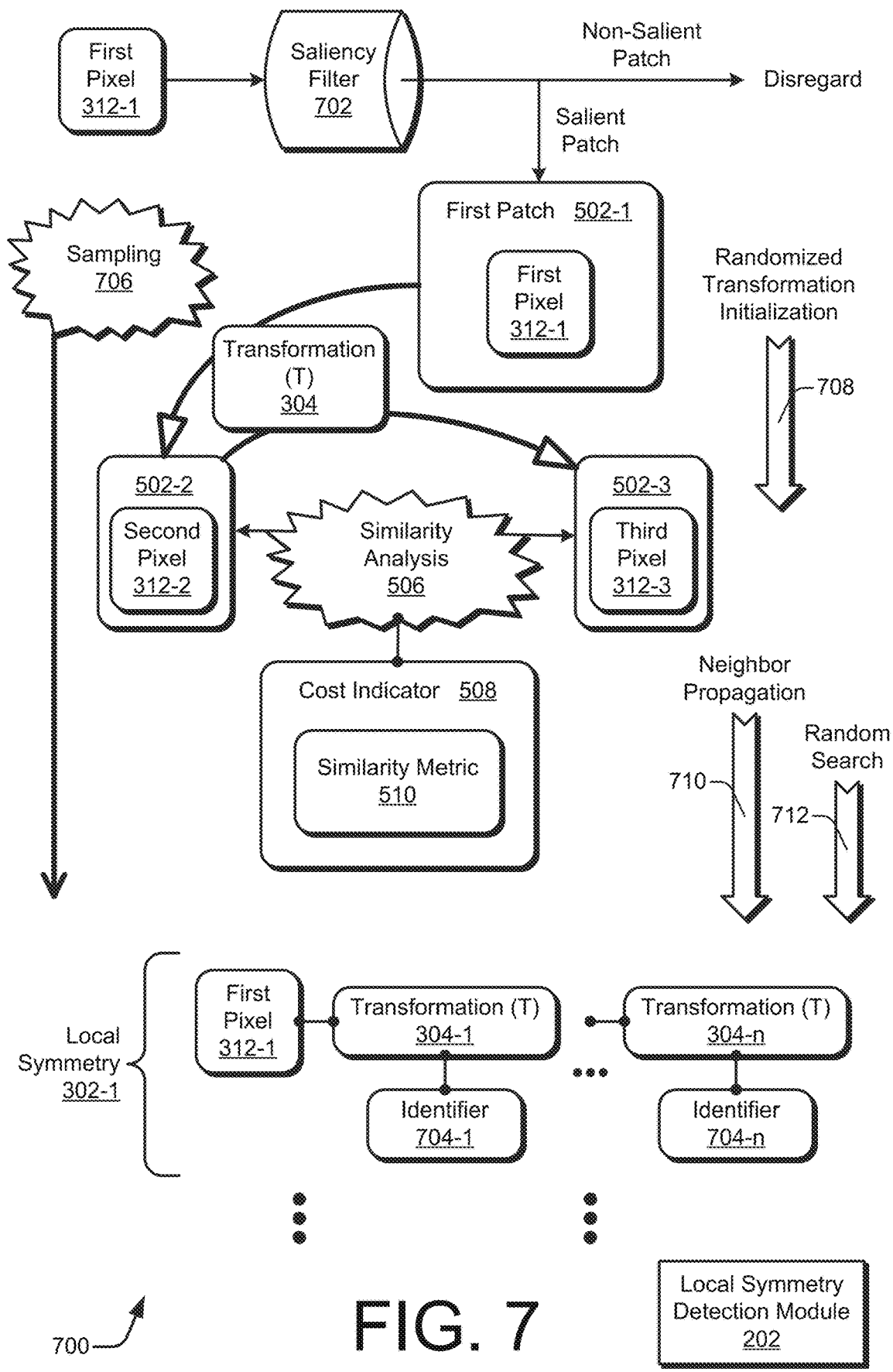
FIG. 7 illustrates an example approach for detecting local symmetries that are represented by repeated similarity correspondences.

FIG. 7 illustrates an example approach 700 for detecting local symmetries 302 that are represented by repeated similarity correspondences. In the subsection above entitled "Local Symmetry Formulation" and with reference to FIG. 5, a local symmetry is described in terms of a triplet of pixels 312 and respective corresponding patches 502. The patches 502 of a given local symmetry 302 are determined to be similar to one another and related by a transformation 304. The approach 700 illustrates how multiple such local symmetries 302 can be detected across an original image 126-1 by the local symmetry detection module 202. The triplet of pixels 312 and respective corresponding patches 502 include: a first pixel 312-1, a corresponding first patch 502-1, a second pixel 312-2, a corresponding second patch 502-2, a third pixel 312-3 and a corresponding third patch 502-3.

Each pixel 312 of the original image 126-1 can be analyzed in an attempt to find a local symmetry 302 on a pixel-by-pixel basis. However, certain pixels can alternatively be excluded from the detection process because such pixels correspond to a flat patch (e.g., a patch with little color change between pixels). For example, the local symmetry detection module 202 inputs each patch to a saliency filter 702. Non-salient patches are disregarded, but salient patches are analyzed further. A saliency metric s(x) for the saliency filter 702 can be implemented by finding a minimum difference between a given patch and four respective derivative patches that are derived from the given patch by respectively shifting the given patch in four cardinal directions (+/−x and +/−y) by some linear distance, such as 2-7 pixels or 20-50% the size of the given patch. A example formula for the saliency metric s(x) is given as:

$$s(x)=\min[d(p,p+\Delta x),d(p,p-\Delta x),d(p,p+\Delta y),d(p,p-\Delta y)],$$

with x representative of a pixel, p representative of a patch, and the "d" operator representative of a difference or distance function between the two patches.

Qualitatively, salient patches are those disposed in an area with color variability or an appreciable gradient. In other words, flat, non-structured patches are much more tolerant to their correspondences, so extensively searching for the best one does not contribute to finding meaningful symmetries in the structured parts of the image. Thus, the random sampling stage can be focused on patches that are salient. Non-salient patches nevertheless contribute to the local symmetry detection stage by propagating correspondences, but the focus for the symmetry exploration efforts is on the structured parts of the image.

Continuing with a description of local symmetry detection efforts, the local symmetry detection module 202 applies salient patches to the local symmetry detection stage as illustrated in FIG. 7 by the first patch 502-1, which corresponds to the first pixel 312-1. The sampling 706 to find a similarity correspondence can be performed using an expanded or enhanced version of the GPM algorithm. The local symmetry detection module 202 therefore initializes each pixel with a random transformation as indicated at arrow 708. By parameterizing the search in the pixel space, the randomized initialization for the first pixel 312-1 produces the second pixel 312-2, which corresponds to the second patch 502-2. The first patch 502-1 and the second patch 502-2 are related by some transformation 304, and this transformation 304 is determined. This transformation 304 is then applied from the first patch 502-1 or the second patch 502-2 to ascertain the third patch 502-3, which corresponds to the third pixel 312-3.

The local symmetry detection module 202 performs the similarity analysis 506 to the first, second, and third patches 502-1, 502-2, and 502-3 to determine a cost indicator 508 for this transformation 304 based on the similarity metric 510.

If the current cost indicator 508 is superior to (e.g., less than) the cost indicators of other ones of the up to n transformations 304 that are already associated with the first pixel 312-1, then the current transformation 304 is added to the set of n transformations 304, and any above the total n are removed from the set. The local symmetry 302-1, which is shown at the lower portion of FIG. 7, is represented by the first pixel 312-1 in conjunction with up to n transformations 304-1 . . . 304-n. Each respective transformation 304-1 . . . 304-n is associated with a respective identifier 704-1 . . . 704-n, which is described below.

To continue searching for transformations that produce patches that are more similar to the first patch 502-1 under a different transformation, the local symmetry detection module 202 implements two strategies in parallel. The random search strategy, as indicated by an arrow 712, continues to randomly test other pixels, but those other pixels are sampled from increasingly smaller regions of the overall original image 126-1. Transformations 304 that are discovered using the random search strategy are assigned or tagged with an associated identifier 704. The neighbor propagation strategy, as indicated by an arrow 710, involves sharing transformations between neighboring pixels. The pixel 312-1 obtains at least one transformation 304 from an adjacent or proximate neighboring pixel and performs a similarity analysis 506 on the suggested transformation 304 to determine if that transformation should be added to the set of associated transformations 304-1 . . . 304-n for the first pixel 312-1. The associated identifier 704 is also retained to facilitate local symmetry clustering, which is described in the following subsection entitled "Local Symmetry Clustering."

An example parameterization for the transformation 304 is described below from a quantitative perspective, along with the effects of such parameterization on the sampling and search for additional local symmetries. For a transformation representation that is based on an image space, a similarity transformation in 2D homogeneous coordinates can be expressed using four parameters a, b, c, d as shown in Equation (2):

$$T = \begin{pmatrix} a & -b & c \\ n & a & d \\ 0 & 0 & 1 \end{pmatrix}. \quad (2)$$

A transformation of this form can be fully determined by two correspondences, such as the following system of Equations (3):

$$Tx=y; \text{ and}$$

$$Ty=z. \quad (3)$$

This system of equations uniquely determines the similarity transformation T for any three points x, y, z, such that x≠y^y≠z. Thus, at any point x, given a pair of points y, z there is a unique transformation T such that the above equation holds. Conversely, given a transformation T, a unique y and z can be computed.

These three points are used to measure the cost of the transformation, with each transformation interpretable as a triplet of points in image space. To take advantage of this equivalence, three operations are performed. First, a check is performed to verify whether the transformation is valid or not. The transformation is valid if the three projected points are within the bounds of the image. Second, an amount of difference between two transformations at a given point is determined by measuring the distance between the corresponding projected points. The following transformation difference equation, for example, can be used: $d_x(T_1, T_2) = \|T_1 x - T_2 x\|^2 + \|T_1^2 x - T_2^2 x\|^2$. Third, a check is performed to reinterpret perturbations of the transformation in image space in the random sampling stage.

This formulation is extended to include reflection transformations by flipping the signs of the values in the first column of the symbolic matrix given in Equation (2) above. This does alter the structure of Equation (3) when determining the parameters a, b, c, d. To accommodate this alteration, whether a particular transformation is reflective or not is tracked during the local symmetry detection.

Two transformations are considered distinct if the transformations differ in their reflective component (e.g., the sign of the determinant of T) or if the mutual transformation distance between the two transformations, as set forth above, is greater than some mutual distance threshold amount, such as three pixels. Conversely, two transformations can be comparable to one another if the two transformations are identical to each other or are within the mutual distance threshold amount.

Local Symmetry Clustering

Although local symmetries that are detected as described herein do capture small-scale repetitions well, a given image may also include large-scale symmetries that are supported over more sizable areas of the image. One approach to progress toward larger-scale symmetries is to perform clustering of the detected point-based local symmetries to form larger regions. To facilitate such clustering, intrinsic properties of the strategies employed to detect local symmetries are utilized to perform a first-pass clustering that moves the image symmetries toward larger-scale symmetries.

As described in the preceding subsection, new transformations are created in the random search phase of the local symmetry stage as indicated by the arrow 712. During the neighbor propagation phase, existing transformations are propagated from one pixel to another pixel verbatim, without any changes. This property is utilized by assigning a unique label to each newly-generated transformation 304, which is termed the transformation identifier 704 as depicted in FIG. 7. This transformation identifier 704 is then propagated along with the actual transformation 304. Thus, at the conclusion of the local symmetry detection stage, the transformation identifiers 704 can serve as a set of clustering symmetry transformation labels.

Figure 8:
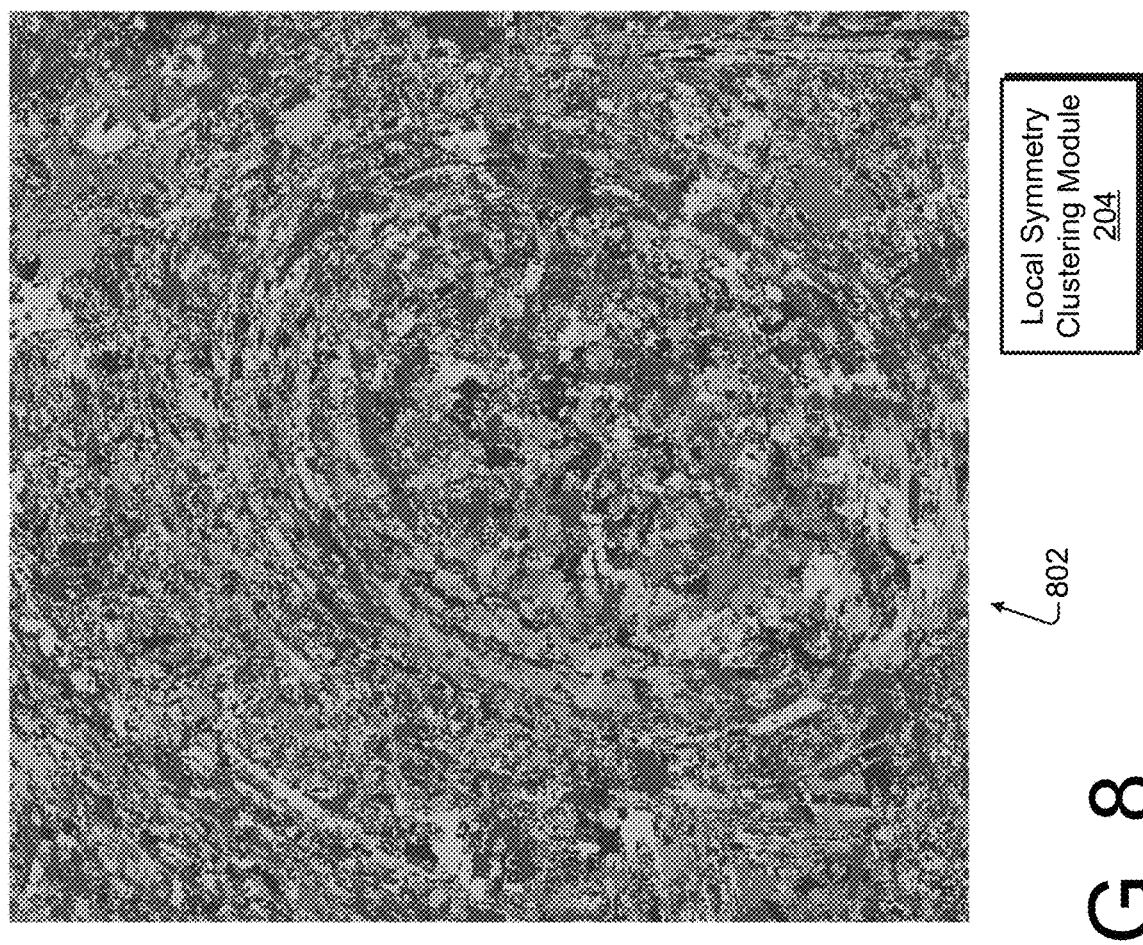
FIG. 8 illustrates an example approach to organizing local symmetries into symmetry clusters based on transformations and corresponding pixels.
Figure 8:
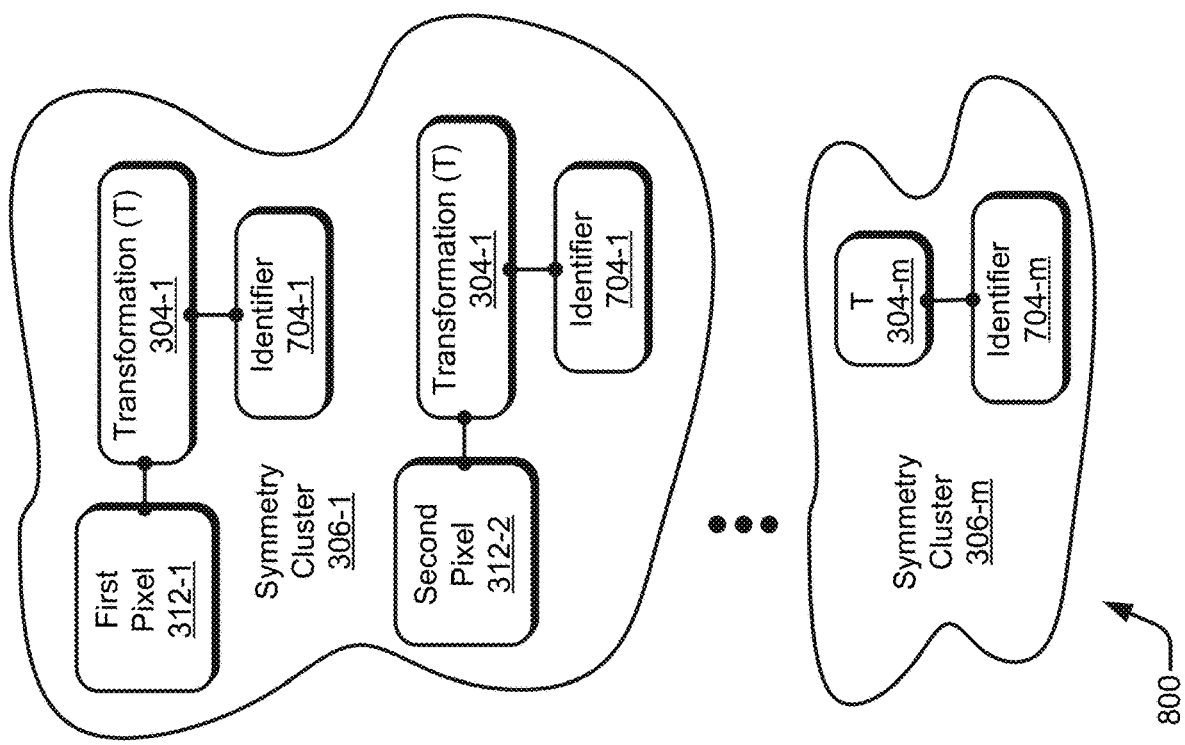

FIG. 8 illustrates an example approach 800 to organizing local symmetries into symmetry clusters 306 based on transformations 304 and corresponding pixels 312. The local symmetry clustering module 204 clusters local symmetries 302, as represented by pixel-transformation associations, into symmetry clusters 306 based on the transformations 304. As shown, the local symmetry clustering module 204 produces m symmetry clusters 306-1 . . . 306-m, with m representing some integer, by including pixels 312 that correspond to particular transformations 304 in each symmetry cluster 306.

Each symmetry cluster 306-1 corresponds to a single transformation 304 or a group of comparable transformations, with the comparable transformations 304 including those transformations that are identical to one another or are not distinct based on the mutual transformation distance criterion described above. For example, each respective symmetry cluster 306 can correspond to a particular transformation 304 that is associated with a respective transformation identifier 704. Thus, the symmetry cluster 306-1 includes a first pixel 312-1 and a second pixel 312-2, both of which correspond to a same transformation 304-1 that is associated with the same identifier 704-1. Similarly, the symmetry cluster 306-m includes the pixels that correspond to a same transformation 304-m that is associated with the same identifier 704-m.

On the right side of FIG. 8, the image 802 shows an example of a symmetry clustering map for the stained-glass picture of FIGS. 4-1, 4-2, and 6-2. Each symmetry cluster 306 is represented by a different shade of gray in the image 802.

The utility of this clustering is two-fold. First, subsequent stages of the process can focus on each unique transformation one time instead of once for each pixel to which the transformation corresponds. Second, transformations that only appear in small groups of pixels or in strictly non-salient areas can be discarded. At the end of this stage, a set of similarity transforms have been estimated that capture the symmetries in small local regions of the image. In the next stage, these local symmetries are refined to recover global symmetries, which are encoded as homographies to capture perspective distortions. Thus, this approach can capture symmetries over large global regions of the image.

Global Symmetry Generation

Figure 9:
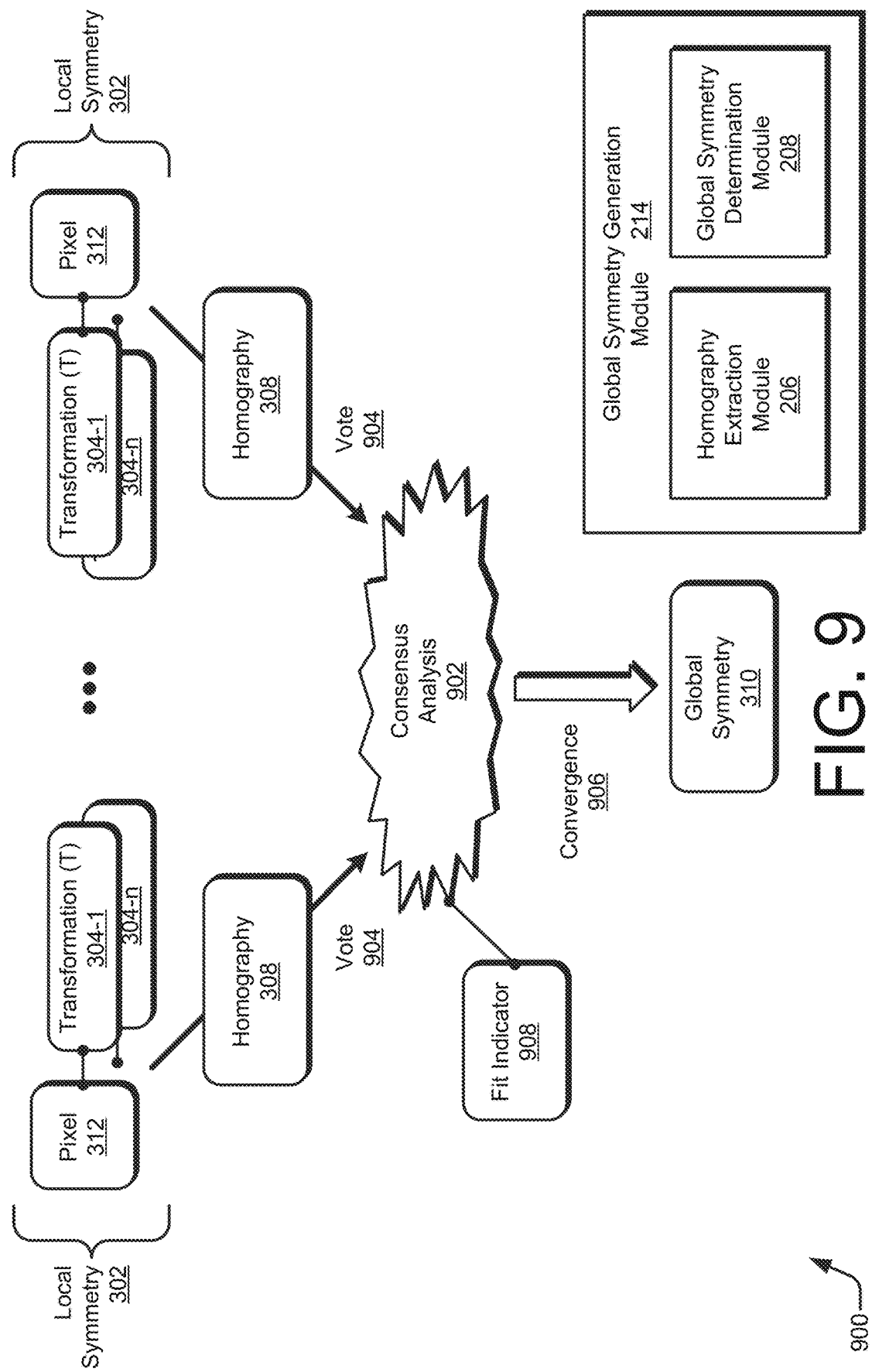
FIG. 9 illustrates an example approach to generating a global symmetry from multiple local symmetries based on an extracted homography.

FIG. 9 illustrates an example approach 900 to generating a global symmetry 310 from multiple local symmetries 302 based on an extracted homography 308. As shown, the approach 900 includes multiple local symmetries 302 that are each represented by a pixel 312 in conjunction with a set of transformations 304-1 . . . 304-n. The global symmetry generation module 214 uses the detected local symmetries 302 to generate at least one global symmetry 310 of the original image 126-1 (e.g., of FIG. 5). The global symmetry generation module 214 can operate on individual local symmetries 302, or the global symmetry generation module 214 can operate on symmetry clusters 306 (e.g., of FIGS. 3 and 8) to lower processing demands.

In operation, the homography extraction module 206 extracts a respective homography 308 for each local symmetry 302 under consideration, individually or jointly via a symmetry cluster 306. Each local symmetry 302 contributes a vote 904 for a candidate homography 308. The homography 308 characterizes a perspective component using at least two transformations 304 from each set of transformations 304-1 . . . 304-n or from two different local symmetries 302. After extracting multiple homographies 308, the votes 904 are analyzed to arrive at a consensus.

The global symmetry determination module 208 performs a consensus analysis 902 to determine which one or more candidate homographies 308 that are contributed for consideration fit the local symmetries 302 across the original image 126-1. An example of an algorithm for performing the consensus analysis 902 is the RANSAC algorithm, but other algorithms can alternatively be used. A randomized subset of the total votes 904 are used to establish a potential overarching homography. This potential overarching homography is then tested against the local symmetries 302 to calculate a fit indicator 908. If the fit indicator 908 is within a given tolerance, the consensus analysis 902 can be considered converged. On the other hand, if the fit indicator 908 is not within the given tolerance, then a different randomized subset of total votes 904 are used to establish a different potential overarching homography. This process is iterated until a convergence 906 is attained. The global symmetry determination module 208 uses the converged homography to determine the global symmetry 310.

Example quantitative aspects of global symmetry generation are described below. In many practical settings, image patches of any feasible size are too small to discover free-form, out-of-plane symmetries, because perspective effects in each patch are subtle and the resampling error therefore tends to dominate. Thus, an additional phase is performed as part of the global symmetry generation stage on top of the local symmetry detection. This additional phase attempts to find a global homography that locally maximizes the number of pixels explained by the symmetry. For this phase, the notion of when a pixel is "explained" is defined below first. A gradient-descent algorithm is then described second.

Generally, an alignment confidence value is estimated as a metric indicative of an extent to which a potential overarching global homography fits with a particular pixel. Given a candidate symmetry transformation T, each patch p may be isomorphically mapped onto a counterpart patch p'=T*p within the image. It is therefore possible to measure the dissimilarity between the patch p and the counterpart patch p' to evaluate how well the candidate transformation T aligns the two patches. However, this measure depends significantly on the patch content. Thus, this measure can be fairly high when a greatly structured patch is even slightly misaligned, but fairly low when a non-structured patch is poorly aligned. Accordingly, a more flexible measure of the quality of a transformation is described next.

For this alternative measure, the candidate transformation T is composed with an additional transformation t(x, y), which denotes a translation by (x, y). A quadratic approximation is then used to find the following advection field:

$$a(p) = \underset{x,y}{\operatorname{argmin}} SSD(p, t(x, y) * T * p). \quad (4)$$

Here, the advection field a(p) locally translates each patch p to minimize the dissimilarity between the patch and its projected counterpart, T(p). By analyzing this field, the global symmetry generation module 214 determines which patches have an optimal fitting (e.g., a(p)=(0, 0)), which patches have a nearly perfect fitting (e.g., a(p)→(0, 0)), and which patches are completely mismatched (e.g., a(p)>>(0, 0)).

Specifically, the alignment confidence c(p) of a patch is calculated from the magnitude of the advection vector a(p) and the coherence of this vector field at p, which is calculated using the standard deviation d(p) in a square window around p as shown in Equation (5):

$$c(p) = \exp\left(-\frac{\|a(p)\|^2}{\sigma_l} - \frac{d(p)^2}{\sigma_d}\right), \quad (5)$$

using empirically-determined values for $\sigma_l$ and $\sigma_d$. In an example implementation, these two values are set to be equal to each other (e.g., $\sigma_l=\sigma_d$). Application of this Equation (5) produces a confidence map having values bounded between 0 and 1, which can then be used to evaluate the local alignment accuracy of the candidate transformation T.

This method of estimation, however, is biased for alignment toward larger, flatter areas rather than highly structured ones, whereas the opposite bias would likely achieve a better potential match with the symmetries of the image. To accommodate this bias, a random walk formulation can be used to diffuse the fit indicator values so as to propagate the values from more structured regions to the less structured ones. This can be accomplished, for example, by screening the Poisson equation being solved, along with using the normalized salience s(x) of a pixel as the screening coefficient and the fit value therein as the screening value. This results in Equation (6):

$$\nabla_g^2 p + s(p) = c(p) \cdot s(p), \quad (6)$$

where $\nabla_g$ is the Laplace-Beltrami operator computed from local image gradients g. Thus, the alignment confidence value of interior regions is strongly influenced by the alignment accuracy in the structured regions around them. Further, to avoid overfitting to low-level texture features, the alignment confidence can be calculated on an image pyramid, with the values averaged to produce a final result.

A straightforward implementation of the above-described quantitative approach produces best-fitting global homography estimates for each of the detected local symmetries. Consequently, to select those that represent meaningful symmetries, the extracted homographies are filtered. To do so, the extracted homographies are first ranked by an aggregate alignment confidence value. An aggregate alignment confidence value Ac can be calculated as a sum of the product of the confidence c(x) and saliency s(x) maps described above: $\Sigma_x c(x)s(x)$.

Global Symmetry Association

Figures 1, 10:
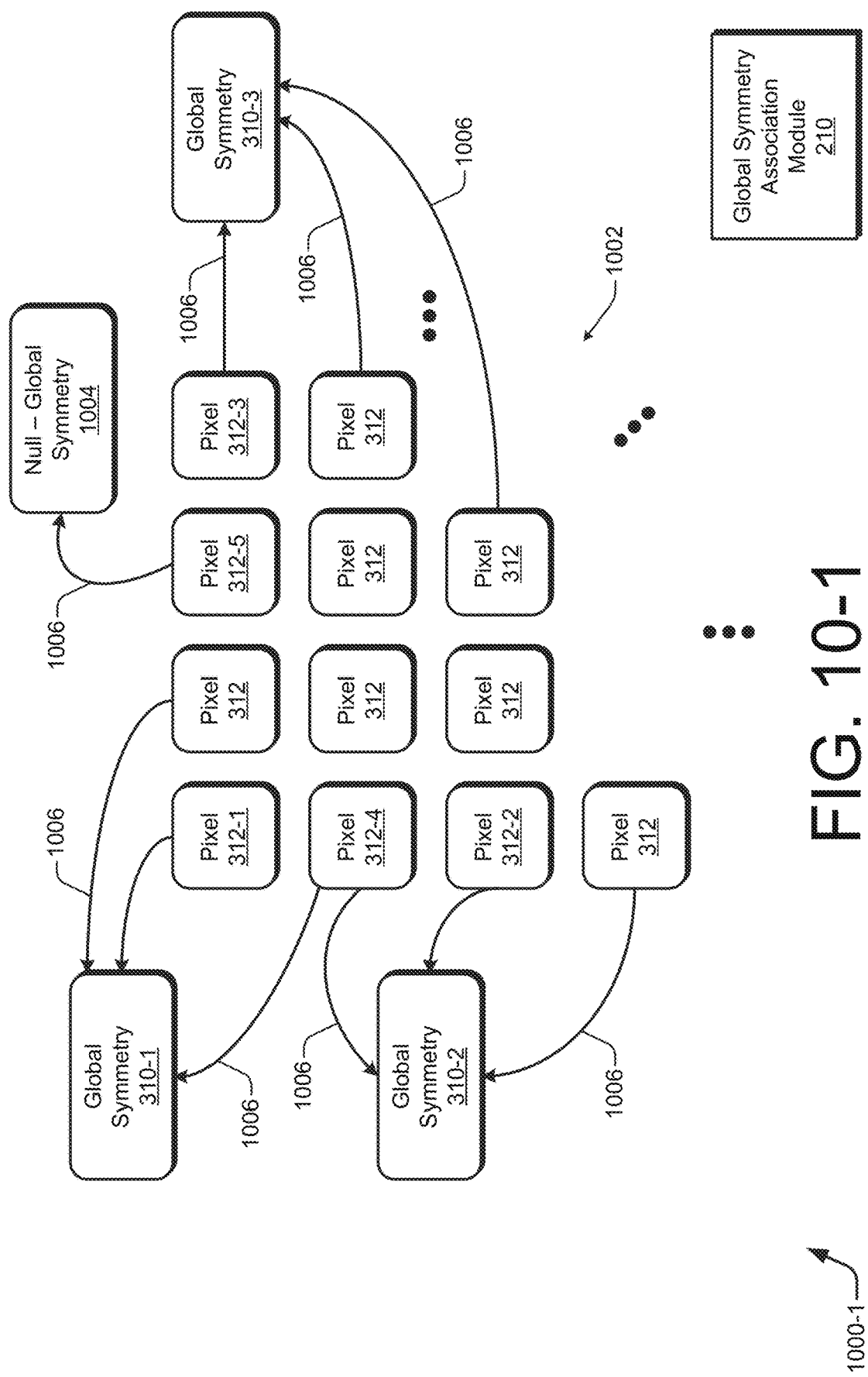
Figure 10:
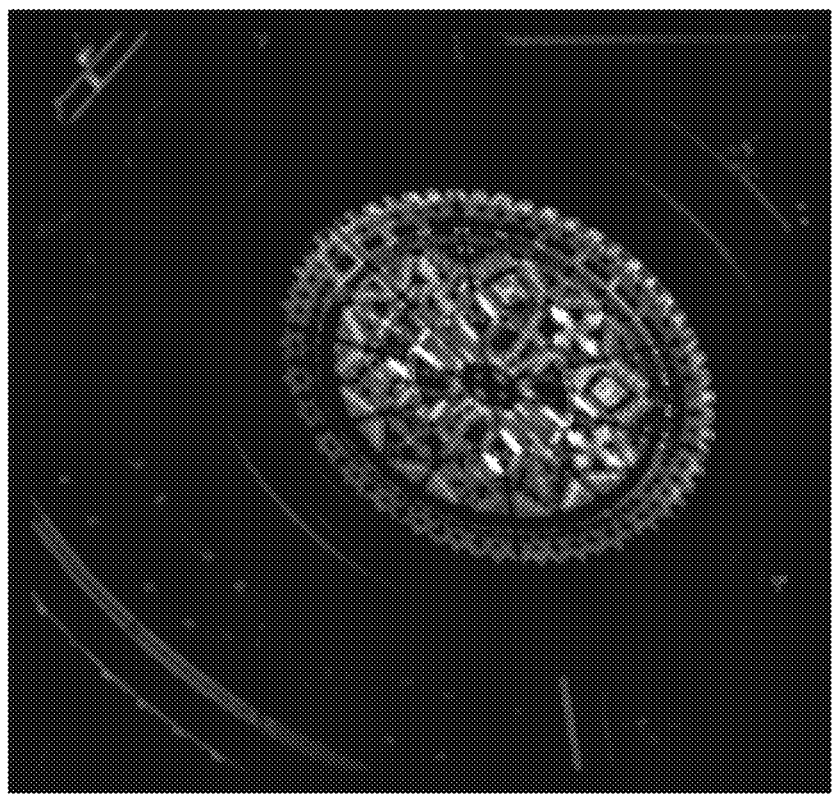
Figure 2:
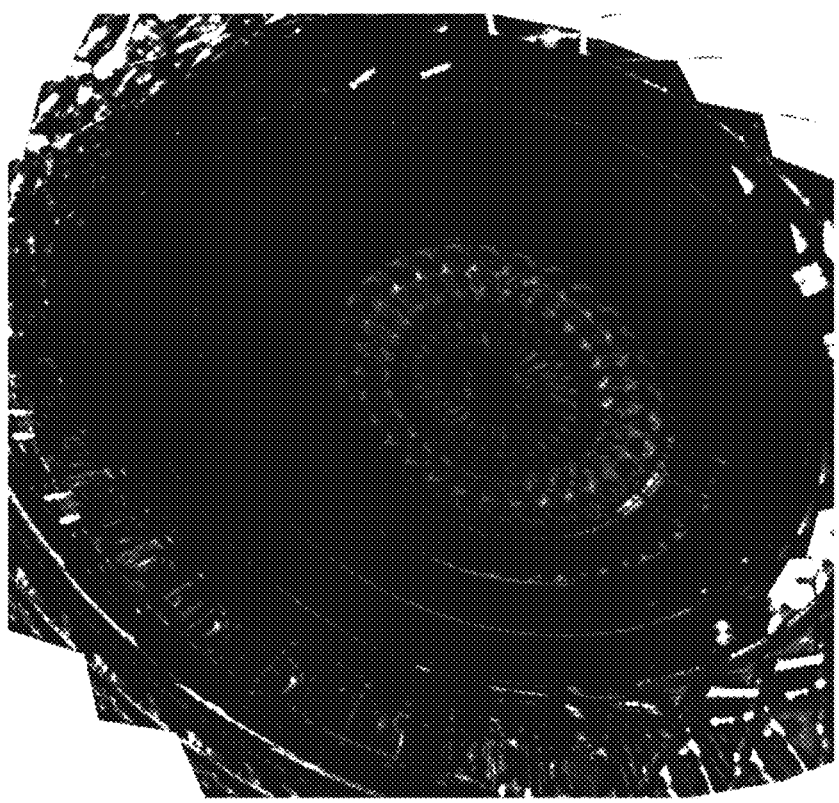

FIG. 10-1 illustrates an example approach 1000-1 to mapping individual pixels 312 to a corresponding global symmetry 310 to produce a global symmetry association map 1002. FIG. 10-1 depicts multiple pixels 312 arranged in a grid, including example pixels 312-1, 312-2, 312-3, 312-4, and 312-5. FIG. 10-1 also depicts indicators for global symmetries, including example indicators for a global symmetry 310-1, a global symmetry 310-2, a global symmetry 310-3, and a null global symmetry indicator 1004. The pixels 312 and the global symmetry indicators are mapped or linked to each other via at least one pixel-to-global symmetry association 1006. Although the associations 1006 are shown originating at the pixels 312 and extending to the global symmetry indicators, alternative manners for establishing the associations 1006 may be implemented.

In operation for the example approach 1000-1, the global symmetry association module 210 can associate each pixel 312 with at least one global symmetry 310 in accordance with the results of the convergence 906 from the consensus analysis 902 (of FIG. 9). Some pixels 312 are mapped to a single global symmetry 310. Examples of single-mapped pixels 312 include: the pixel 312-1 being associated with the global symmetry 310-1, the pixel 312-2 being associated with the global symmetry 310-2, and the pixel 312-3 being associated with the global symmetry 310-3. Some pixels 312 are mapped to multiple global symmetries 310, such as if an image 126 has nested symmetries. For example, the pixel 312-4 is associated with both the global symmetry 310-1 and the global symmetry 310-2. Still other pixels 312 are unmapped to any determined global symmetry 310. For example, the pixel 312-5 is mapped to no indicator or is mapped to the null global symmetry indicator 1004.

FIG. 10-2 depicts generally at 1000-2 examples of support maps for producing or verifying a global symmetry association map 1002. An example of a support map is a symmetry verification map 1012. A heat map representation 1014 of a global symmetry association map 1002 is also depicted. These images correspond to the stained glass window picture of FIGS. 4-1, 4-1, 6-2, and 8. The global symmetry association module 210 can perform a verification as to the accuracy of the global symmetry results by producing a symmetry verification mapping. A symmetry verification map can be used to inform the creation of the global symmetry association map 1002 or to check the accuracy thereof.

To produce a symmetry verification map 1012, the global symmetry association module 210 applies the transformation 304 of the associated global symmetry 310 to each pixel 312 of the original image 126-1 to produce a transformed image (not shown). The global symmetry association module 210 can generate the symmetry verification map 1012 by taking the difference between the original image 126-1 and the transformed image. In an example implementation, the lower the intensity of the pixels of the symmetry verification map 1012, the more accurate are the global symmetry 310 associations of the global symmetry association map 1002. In addition to using the transformed image, the global symmetry association module 210 can factor in salience values and spatial x-y coordinates to produce the symmetry verification map 1012.

Thus, the global symmetry association module 210 uses the pixels 312 of the original image 126-1 and the determined global symmetries 310 to produce the global symmetry association map 1002. The global symmetry association module 210 passes the global symmetry association map 1002 to the image manipulation module 212.

Image Manipulation

Figure 11:
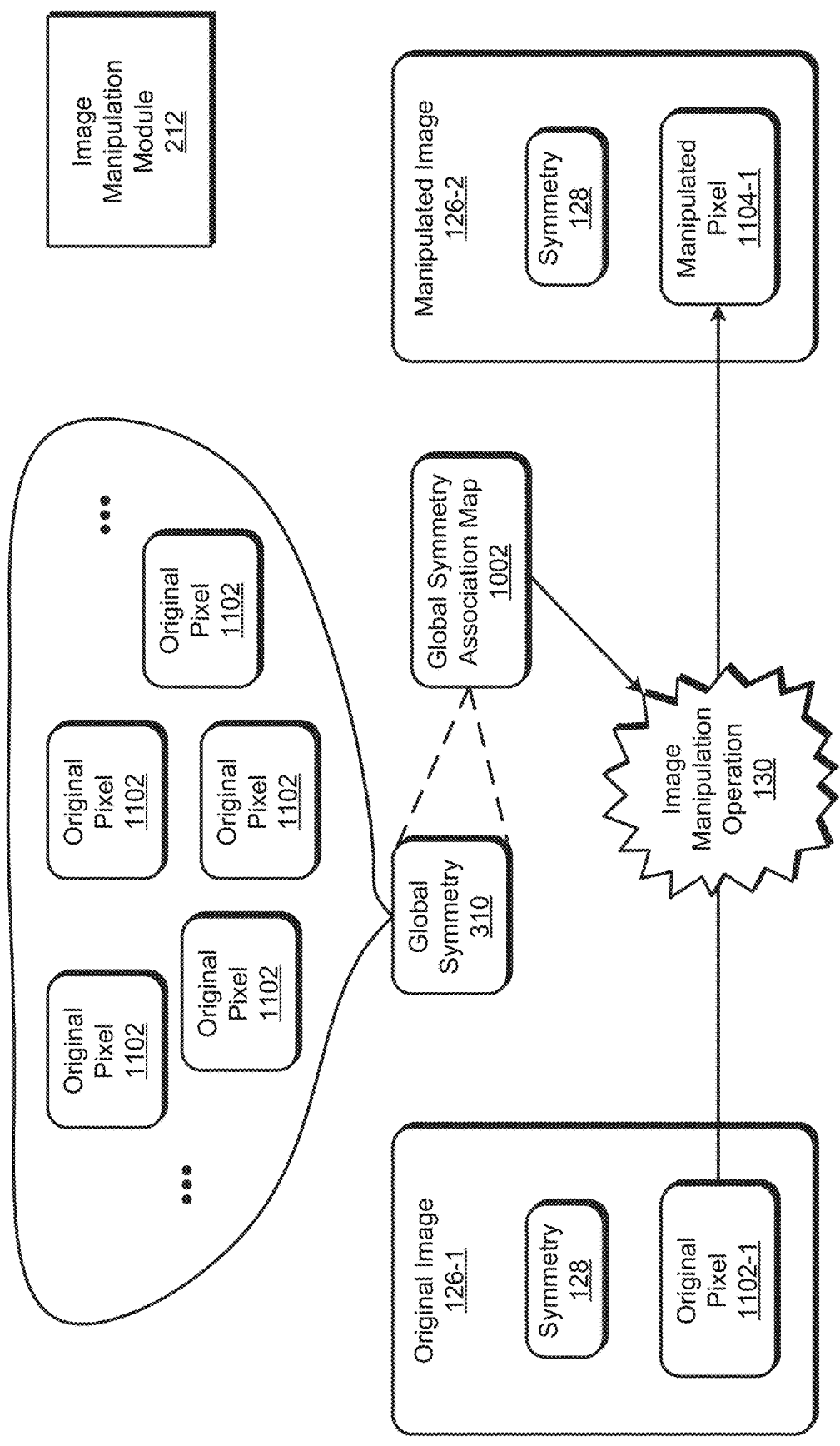
FIG. 11 illustrates an example approach to manipulating an image based on a global symmetry using a global symmetry association map.

FIG. 11 illustrates an example approach 1100 to manipulating an image 126 based on a global symmetry 310. The image manipulation module 212 performs the image manipulation operation 130 on the original image 126-1 to produce the manipulated image 126-2, and the symmetry 128 is at least partially propagated from the original image to the new image. The original image 126-1 includes multiple original pixels 1102, such as the original pixel 1102-1. The manipulated image 126-2 includes multiple manipulated pixels 1104, such as the manipulated pixel 1104-1.

In operation, the image manipulation module 212 can extend or support (e.g., maintain, reinforce, strengthen, or enhance) a determined global symmetry 310 while performing an image manipulation. Examples of image manipulations include image in-painting, completion, or hole-filling; image perspective correction or rectification; image beautification; image segmentation, and combinations thereof. To do so, the image manipulation module 212 can refer to the global symmetry association map 1002. This global symmetry association map 1002 maps certain original pixels 1102 to at least one global symmetry 310 in which individual pixels of the original pixels 1102 participate.

The image manipulation module 212 can use the global symmetry association map 1002 as constraints that are applied to the image manipulation operation 130. For example, a color value of a manipulated pixel 1104-1 can be informed by the color values of multiple original pixels 1102 that correspond to the original pixel 1102-1, with the multiple original pixels 1102 corresponding to the original pixel 1102-1 based on a transformation of the global symmetry 310 being applied to the original image 126-1. Further, the manipulated pixel 1104-2 that is inserted into an obscured region of the original image 126-1 as part of a hole-filling operation can be assigned a value corresponding to a transformed pixel value from the original pixel 1102-1 based on a corresponding patch of the original image 126-1.

Having discussed example details of systems, techniques, and schemes for image modification using detected symmetry, consider now some example procedures to illustrate additional aspects of the techniques.

Example Procedures

Figure 12:
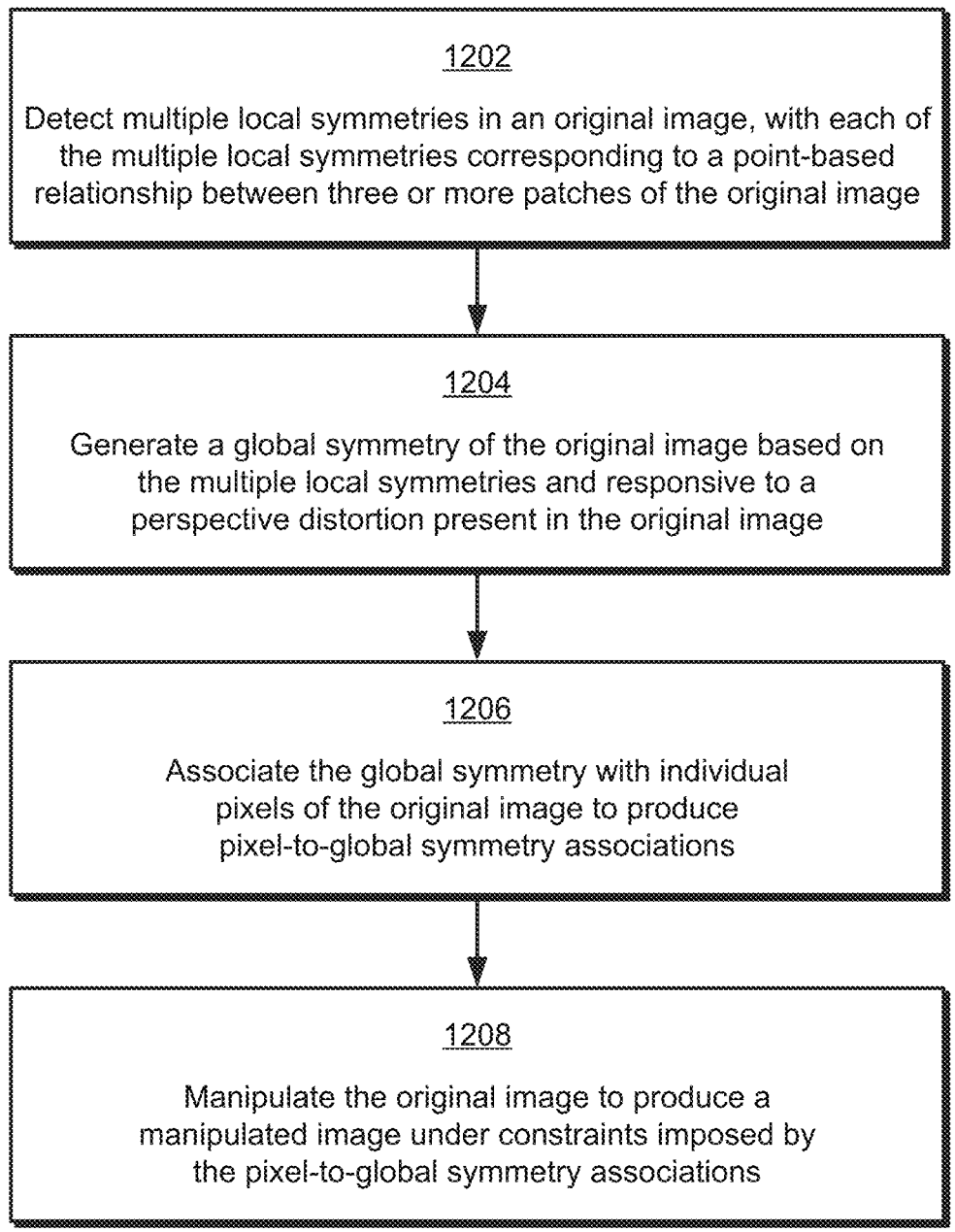
FIG. 12 is a flow diagram illustrating an example procedure in accordance with one or more example implementations.
Figure 13:
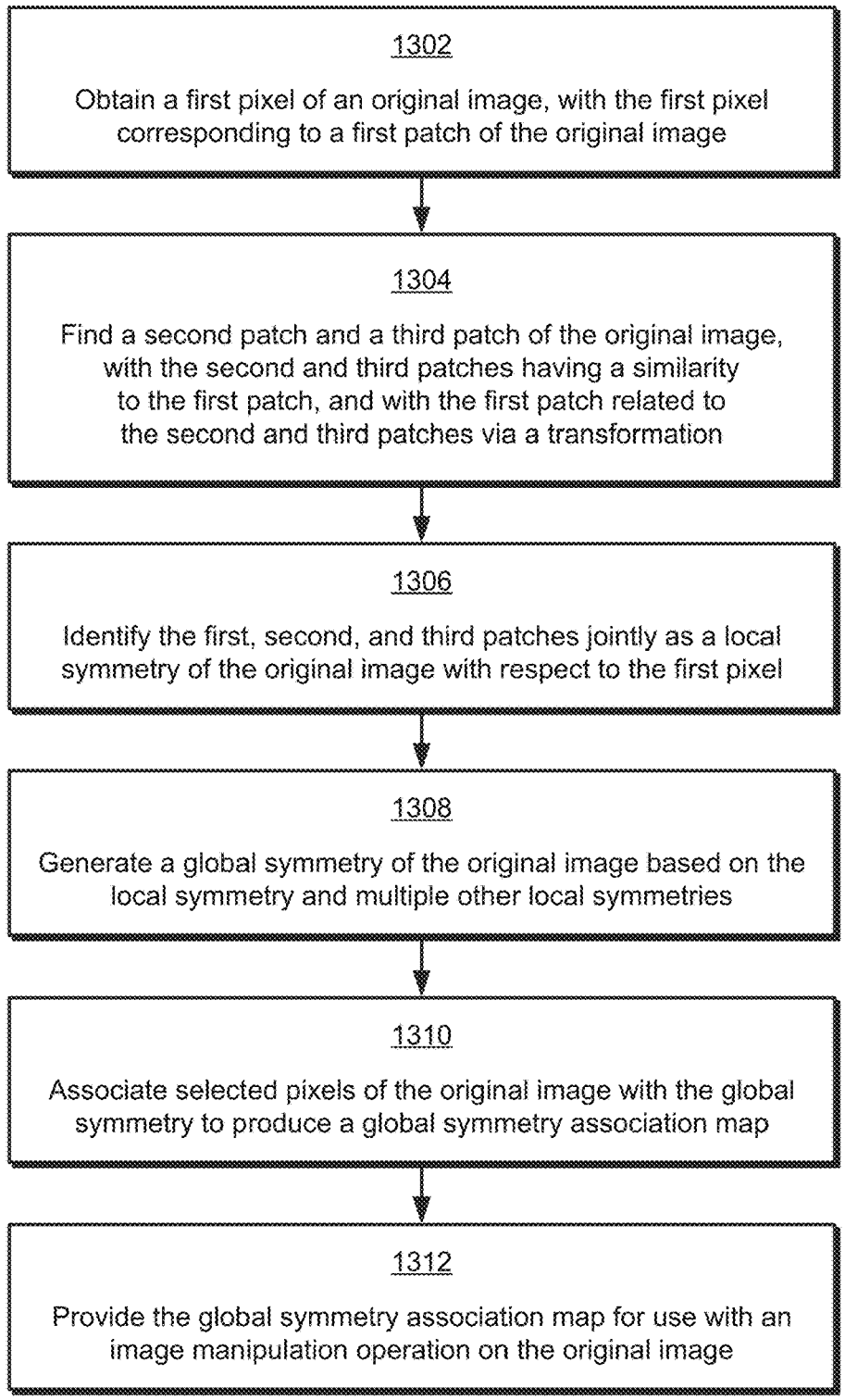
FIG. 13 is another flow diagram illustrating another example procedure in accordance with one or more example implementations.

This section describes with reference to FIGS. 12 and 13 example procedures relating to image modification using detected symmetry in one or more implementations. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as an example computing device 102 (of FIG. 1) or 1402 (of FIG. 14) using an image modification module 124 (e.g., of FIGS. 1, 2, and 14).

FIG. 12 is a flow diagram that includes four blocks 1202-1208 and that illustrates an example procedure 1200 for image modification using detected symmetry in accordance with one or more example implementations. At block 1202, multiple local symmetries are detected in an original image, with each of the multiple local symmetries corresponding to a point-based relationship between three or more patches of the original image. For example, a computing device 102 can detect multiple local symmetries 302 in an original image 126-1, with each of the multiple local symmetries 302 corresponding to a point-based relationship between three or more patches 502 of the original image 126-1. The block 1202 may be implemented by a local symmetry detection module 202 as described hereinabove in the subsections entitled "Local Symmetry Formulation" and "Local Symmetry Detection."

At block 1204, a global symmetry of the original image is generated based on the multiple local symmetries and responsive to a perspective distortion present in the original image. For example, the computing device 102 can generate a global symmetry 310 of the original image 126-1 based on the multiple local symmetries 302 and responsive to a perspective distortion present in the original image 126-1. The block 1204 may be implemented by a global symmetry generation module 214 as described hereinabove in the subsection entitled "Global Symmetry Generation."

At block 1206, the global symmetry is associated with individual pixels of the original image to produce pixel-to-global symmetry associations. For example, the computing device 102 can associate the global symmetry 310 with individual pixels 312 of the original image 126-1 to produce pixel-to-global symmetry associations 1006. The block 1206 may be implemented by a global symmetry association module 210 as described hereinabove in the subsection entitled "Global Symmetry Association."

At block 1208, the original image is manipulated to produce a manipulated image under constraints imposed by the pixel-to-global symmetry associations. For example, the computing device 102 can manipulate the original image 126-1 to produce a manipulated image 126-2 under constraints imposed by the pixel-to-global symmetry associations 1006. The constraints may, for instance, nudge values of manipulated pixels 1104 toward one or more values that match the values of original pixels 1102 that correspond to the manipulated pixels 1104 via at least one transformation 304 of the global symmetry 310.

FIG. 13 is a flow diagram that includes six blocks 1302-1312 and that illustrates an example procedure 1300 for image modification using detected symmetry in accordance with one or more example implementations. At block 1302, a first pixel of an original image is obtained, with the first pixel corresponding to a first patch of the original image. For example, a computing device 102 can obtain a first pixel 312-1 of an original image 126-1, with the first pixel 312-1 corresponding to a first patch 502-1 of the original image 126-1.

At block 1304, a second patch and a third patch of the original image are found, with the second and third patches having a similarity to the first patch, and the first patch related to the second and third patches via a transformation. For example, the computing device 102 can find a second patch 502-2 and a third patch 502-3 of the original image 126-1, with the second and third patches 502-2 and 502-3 having a similarity to the first patch 502-1 (e.g., based on a similarity metric 510). The first patch 502-1 is related to the second and third patches 502-2 and 502-3 via a transformation 304. At block 1306, the first, second, and third patches are identified jointly as a local symmetry of the original image with respect to the first pixel. For example, the computing device 102 can identify the first, second, and third patches 502-1, 502-2 and 502-3 jointly as a local symmetry 302-1 of the original image 126-1 with respect to the first pixel 312-1.

At block 1308, a global symmetry of the original image is generated based on the local symmetry and multiple other local symmetries. For example, the computing device 102 can generate a global symmetry 310 of the original image 126-1 based on the local symmetry 302-1 and multiple other local symmetries 302. At block 1310, selected pixels of the original image are associated with the global symmetry to produce a global symmetry association map. For example, the computing device 102 can associate 1006 selected pixels 312 of the original image 126-1 with the global symmetry 310 to produce a global symmetry association map 1002. At block 1312, the global symmetry association map is provided for use with an image manipulation operation on the original image. For example, the computing device 102 can provide the global symmetry association map 1002 for use with an image manipulation operation 130 on the original image 126-1.

Having described example procedures in accordance with one or more embodiments, consider now an example system and device that can be utilized to implement the various schemes and techniques described herein.

Example System and Device

Figure 14:
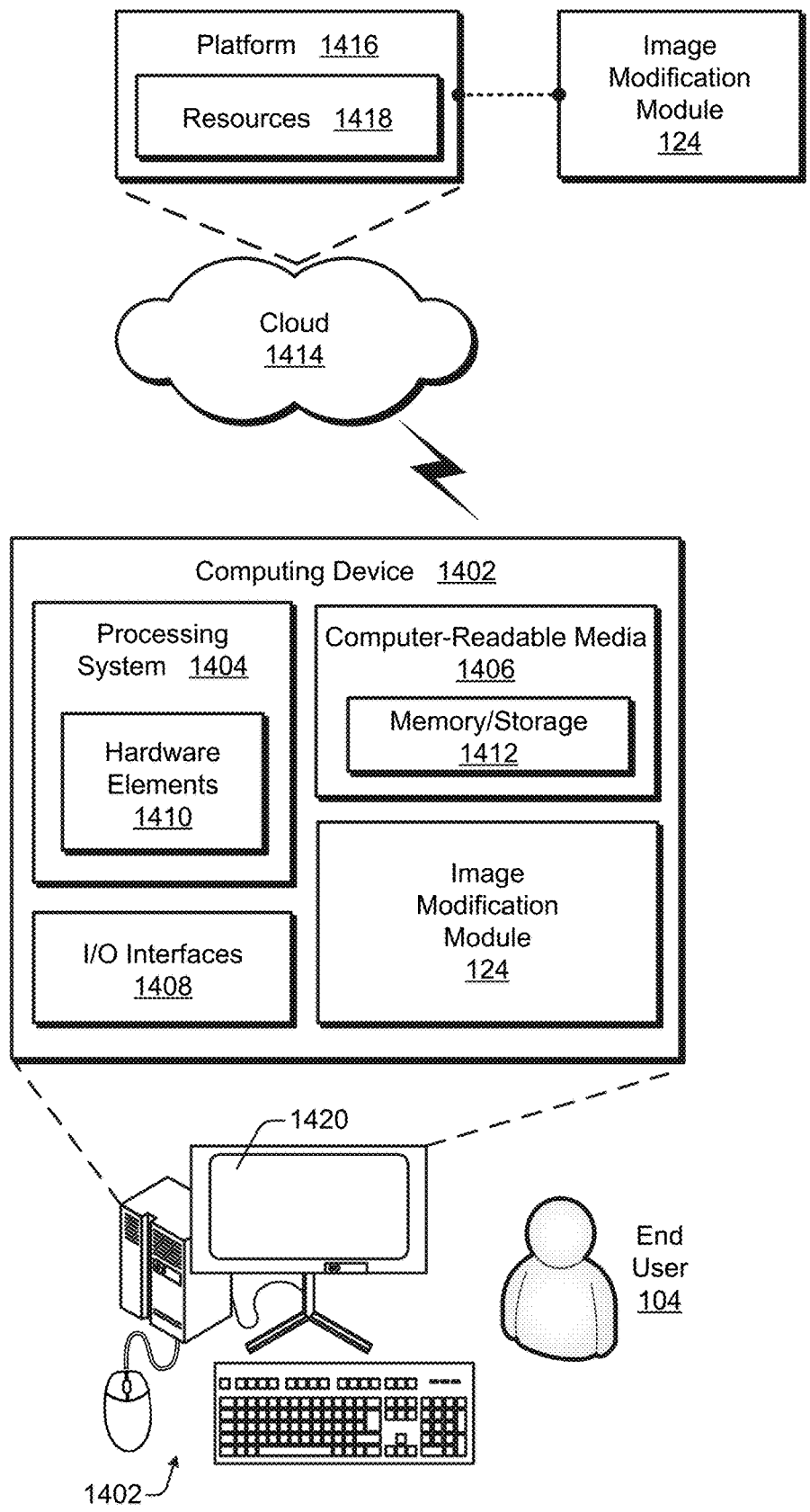
FIG. 14 illustrates an example system including various components of example computing devices that can be employed for one or more implementations of image modification using detected symmetry.

FIG. 14 illustrates generally at 1400 an example system including an example computing device 1402 representative of one or more computing systems or computing devices that may implement the various techniques described herein. This is depicted through the inclusion of an image modification module 124, which may operate as described herein above. A computing device 1402 may be implemented as, for example, a computing device 102 (of FIG. 1) in an independent or standalone mode. The computing device 1402 can display an image or user interface aspects of an imaging application to the end user 104 via a display screen 1420. Generally, a computing device 1402 may be implemented as, for example, an end user device (e.g., a smart phone or desktop computer) of an end user 104, a corporate device (e.g., a server side device or data center hardware) of a business, an on-chip system or system-on-a-chip (SOC) (e.g., that is integrated with a tablet device or a display device), or any other suitable computing device or computing system.

In an example implementation as shown in FIG. 1, the image modification module 124 is executing at one location (e.g., within a housing of the computing device 102). However, the image modification module 124 can alternatively be executing in the cloud (e.g., on a network-side computing device) if bandwidth is sufficiently large or transmission latency is sufficiently small, and such an example implementation is also shown in FIG. 14. Alternatively, a portion of the image modification module 124 can be executing at both a client-side computing device and a server-side computing device. In such an implementation, the operations implemented by the image modification module 124 as described herein may be distributed across a client-server architecture.

The example computing device 1402 as illustrated includes at least one processing system 1404, one or more computer-readable media 1406, and one or more I/O interfaces 1408 that may be communicatively coupled, one to another. Although not explicitly shown, the computing device 1402 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including one or more hardware elements 1410 that may be implemented as processors, functional blocks, and so forth. This may include implementation in hardware as an application specific integrated circuit (ASIC), a general-purpose processor, or other logic device formed using e.g. one or more semiconductors. The hardware elements 1410 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (e.g., random access memory (RAM)) or nonvolatile media (e.g., read only memory (ROM), flash memory, optical discs, or magnetic disks). The memory/storage component 1412 may include fixed media (e.g., RAM, ROM, or a fixed hard drive) or removable media (e.g., a flash memory card, a removable hard drive, or an optical disc). The computer-readable media 1406 may be implemented in a variety of other ways as further described below.

The input/output interface(s) 1408 are representative of functionality to allow a user to enter commands or information to computing device 1402 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1402 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1406 may include a variety of media that may be accessed by the computing device 1402. By way of example, and not limitation, computer-readable media may include "computer-readable storage media" or "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non removable, media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1402, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct wired connection, or wireless media, such as acoustic, RF, microwave, infrared, or other wireless media.

As previously described, hardware elements 1410 or computer-readable media 1406 may be representative of modules, programmable device logic, fixed device logic, a combination thereof, and so forth that are implemented in a hardware form that may be employed in some embodiments to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer readable storage media or by one or more hardware elements 1410. The computing device 1402 may be configured to implement particular instructions or functions corresponding to software or hardware modules. Accordingly, implementation of a module that is executable by the computing device 1402 as software may be achieved at least partially in hardware, e.g., through use of computer-readable storage media or the hardware elements 1410 of the processing system 1404. The instructions or functions may be executable/operable by one or more articles of manufacture (e.g., one or more computing devices 1402 or processing systems 1404) to implement techniques, modules, or examples described herein.

The techniques described herein may be supported by various configurations of the computing device 1402 and are not limited to the specific aspects of the example devices described herein. This functionality may also be implemented fully or partially through use of a distributed system, such as over a "cloud" 1414 via a platform 1416 as described below.

The cloud 1414 may include or represent a platform 1416 for resources 1418. The platform 1416 abstracts underlying functionality of hardware (e.g., one or more servers or at least one data center) and software resources of the cloud 1414. The resources 1418 may include applications or data that can be utilized while computer processing is at least partially executed on servers remote from, or distributed around, the computing device 1402. Resources 1418 may also include services provided over the Internet or through a subscriber network, such as a cellular or Wi-Fi network.

The platform 1416 may abstract resources and functions to connect the computing device 1402 with other computing devices or services. The platform 1416 may also serve to abstract a scaling of resources to provide a corresponding level of scale to encountered demand for the resources 1418 implemented via the platform 1416. Accordingly, in an interconnected device embodiment, implementation of functionality described herein may be distributed throughout the illustrated system of FIG. 14, or at least throughout the cloud 1414 along with the computing device 1402. For example, functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
generating, by the at least one computing device, salient patches by filtering patches from an original image using a saliency filter, the saliency filter utilizing a saliency metric based on an amount of visual structure corresponding to the patches, the saliency metric defined based on difference between a respective said patch and at least one derivative patch;
detecting, by the at least one computing device, multiple local symmetries in the original image, each of the multiple local symmetries corresponding to a point-based relationship between three or more said salient patches of the original image;
generating, by the at least one computing device, a global symmetry of the original image based on the multiple local symmetries; and
outputting, by the at least one computing device, the global symmetry.

2. The method of claim 1, wherein the generating comprises:
extracting a homography of at least one transformation relating to at least a portion of the multiple local symmetries based on multiple homography votes contributed by the multiple local symmetries; and
determining the global symmetry corresponding to the homography to account for perspective distortion present in the original image, wherein the perspective distortion is responsible for differences between appearances of the multiple local symmetries across the original image.

3. The method of claim 1, wherein each local symmetry of the multiple local symmetries is represented by a repeated correspondence including three said salient patches, a location of each said salient patch is defined by a pixel of the original image, and a relationship between the three said salient patches is characterized by a transformation.

4. The method of claim 3, further comprising:
clustering the multiple local symmetries into multiple symmetry clusters based on comparable transformations, and
wherein the generating the global symmetry comprises generating the global symmetry based on the multiple symmetry clusters.

5. The method of claim 3, wherein points of the point-based relationship respectively correspond to pixels of the original image, and the detecting the multiple local symmetries comprises: for a given pixel corresponding to a given said salient patch, finding two patches that are similar to the given patch and related to the given said salient patch by a transformation.

6. The method of claim 4, wherein symmetries captured by respective said symmetry clusters have a larger scale than symmetries captured by respective said local symmetries within the respective said symmetry clusters.

7. The method of claim 1, further comprising
associating, by the at least one computing device, the global symmetry with individual pixels of the original image to produce pixel-to-global symmetry associations; and
manipulating, by the at least one computing device, the original image to produce a manipulated image under constraints under constraints imposed by the pixel-to-global symmetry associations.

8. The method of claim 1, wherein the amount of physical structure is based on color variability or appreciable gradient.

9. The method of claim 1, wherein the saliency metric is defined based on difference between the respective said patch and the at least one derivative patch, the difference based on color variability or appreciable gradient.

10. The method of claim 1, wherein the at least one derivate patch is generated by shifting the respective said salient patch in at least one of four cardinal directions.

11. The method of claim 1, wherein the detecting includes verifying whether a transformation corresponding to a respective said local symmetry is valid.

12. The method of claim 1, further comprising finding the three or more said salient patches from the original image using a neighbor propagation mechanism that shares suggested transformations and a random search mechanism that searches for new transformations in a pixel space of the original image and wherein the detecting is performed responsive to the finding.

13. One or more non-transitory computer-readable storage media storing instructions that, responsive to execution by a processing system, causes the processing system to perform operations including:
generating salient patches by filtering patches from an original image using a saliency filter, the saliency filter employing a saliency metric defined based on a difference between a respective said patch and at least one derivative patch;
detecting multiple local symmetries in the original image, each of the multiple local symmetries corresponding to a point-based relationship between three or more of the salient patches of the original image;
generating a global symmetry of the original image based on the detected multiple local symmetries; and
outputting the global symmetry.

14. The one or more computer-readable storage media of claim 13, wherein the saliency metric is based on color variability or appreciable gradient.

15. The one or more computer-readable storage media of claim 13, further comprising associating the global symmetry with individual pixels of the original image to produce pixel-to-global symmetry associations.

16. The one or more computer-readable storage media of claim 15, further comprising manipulating the original image to produce a manipulated image under constraints imposed by the pixel-to-global symmetry associations.

17. A computing device comprising:
a processing system having one or more processors; and
one or more computer-readable storage media that are non-transitory and storing instructions that, responsive to execution by the processing system, causes the processing system to perform operations including:
generating salient patches by filtering patches from an original image using a saliency filter, the saliency filter employing a saliency metric defined based on a difference between a respective said patch and at least one derivative patch;
detecting multiple local symmetries in the original image, each of the multiple local symmetries corresponding to a point-based relationship between three or more of the salient patches of the original image;

generating a global symmetry of the original image based on the detected multiple local symmetries; and
outputting the global symmetry.

18. The computing device of claim 17, wherein the saliency metric is based on color variability or appreciable gradient.

19. The computing device of claim 17, the operations further comprising associating the global symmetry with individual pixels of the original image to produce pixel-to-global symmetry associations.

20. The computing device of claim 19, the operations further comprising manipulating the original image to produce a manipulated image under constraints imposed by the pixel-to-global symmetry associations.

* * * * *